US006802632B2

(12) United States Patent
Kajitori et al.

(10) Patent No.: US 6,802,632 B2
(45) Date of Patent: Oct. 12, 2004

(54) VEHICULAR LIGHT-EMITTING DEVICE

(75) Inventors: Kyotaro Kajitori, Saitama (JP); Masamoto Ito, Saitama (JP); Seiji Yamaguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/237,606

(22) Filed: Sep. 10, 2002

(65) Prior Publication Data

US 2003/0067781 A1 Apr. 10, 2003

(30) Foreign Application Priority Data

Sep. 17, 2001 (JP) ........................................ 2001-282465
Sep. 17, 2001 (JP) ........................................ 2001-282466

(51) Int. Cl.[7] ................................................. B62J 6/00
(52) U.S. Cl. ...................... 362/473; 362/540; 340/476; 116/35 R
(58) Field of Search ................................ 362/473–476, 362/540; 116/35 R; 340/475; D26/28

(56) References Cited

U.S. PATENT DOCUMENTS 4,495,553 A * 1/1985 Haynes ........................ 362/473
5,820,254 A * 10/1998 Duenas ....................... 362/473
6,619,818 B2 * 9/2003 Grove ......................... 362/474

FOREIGN PATENT DOCUMENTS

JP        62-176902 U    11/1987
JP        2-21313 Y      6/1990

* cited by examiner

Primary Examiner—Stephen F. Husar
(74) Attorney, Agent, or Firm—Birch, Stewart, Kolasch & Birch, LLP

(57) ABSTRACT

A winker device for providing protection for a winker cord and a light-emitting device. The winker device includes a winker holder mounted on a front fork member of a motorcycle, a winker supported on an outer side of the winker holder by a winker support base, and a winker cord extending from the winker holder. The winker holder includes a pair of front and rear holder members. The winker cord is inserted through a cord insertion hole defined in the holder members and is exposed out of the winker holder inwardly of the front fork member. The winker device also includes a light-emitting device body with front and side light-emitting faces that are capable of emitting light. A cover covers only a portion of the light-emitting side face of the light-emitting body.

14 Claims, 41 Drawing Sheets

VEHICULAR LIGHT-EMITTING DEVICE

BACKGROUND OF THE INVENTION

CROSS-REFERENCE TO RELATED APPLICATIONS

The present application claims priority under 35 USC 119 to Japanese Patent Application No. 2001-282466 and 2001-282465 both filed on Sep. 17, 2001 the entire contents thereof is hereby incorporated by reference.

1. Field of the Invention

The present invention relates to a winker device for a two-wheeled vehicle such as a motorcycle or the like and to a vehicular light-emitting device for emitting light on a motorcycle or the like.

2. Description of Background Art

One known winker device on a front vehicle portion of a motorcycle has a winker holder fixed to a steering handle or a front fork member, a support arm (winker support base) of a winker lamp which is attached to the winker holder, and a winker cord connected to the winker lamp, extending through the support arm of the winker lamp out of a portion of the support arm which is attached to the winker holder, and connected to a given location (Japanese Utility Model Laid-open No. Sho 62-176902).

However, the above winker device has been problematic in that although the winker cord extends in the winker device up to the portion of the support arm that is attached to the winker holder, since the winker cord is exposed from the attached portion, the winker cord has a large exposed length. The visible wiring makes the winker device look crude and poor in appearance.

One conventional vehicular light-emitting device is disclosed, for example, in Japanese Utility Model Publication No. Hei 2-21313. The disclosed vehicular light-emitting device has a light-emitting device body capable of emitting light in a forward direction which is a main light-emitting direction and a side direction substantially perpendicular to the forward direction. A cover is provided for fully covering the side of the light-emitting device body.

Another conventional vehicular light-emitting device includes a lens having a light-emitting front face and a light-emitting side face which are capable of emitting light. The vehicular light-emitting device is a structure wherein the light-emitting front face and the light-emitting side face are not covered with a cover or the like.

With the structure in which the side of the light-emitting device body is fully covered with the cover, light cannot be emitted sideways even if light needs to be emitted sideways for indicating directions or the like.

With the structure in which the light-emitting front face and the light-emitting side face are not covered with a cover or the like, emitted light may be applied to the driver, or rainwater may be applied directly to the light-emitting side face.

SUMMARY AND OBJECTS OF THE INVENTION

The present invention has been made in view of the above drawbacks. It is an object of the present invention to provide a winker device which has a winker cord including a reduced exposed length to provide a better appearance for the wiring and to provide better protection for the winker cord.

To achieve the above object, a winker device according to the present invention has a winker holder mounted on front fork members of a two-wheeled vehicle with a winker mounted on a side of the winker holder by a winker support base. A winker cord extends from the winker through the winker support base. The winker holder includes a plurality of holder members disposed in surrounding and sandwiching relation to the outer circumference of each of the front fork members. The winker cord is inserted through a cord insertion hole defined in each of the holder members and extends out of said winker holder.

With the above winker device, the winker cord extends from the winker support base of the winker supported on a side of the winker holder which comprises the plural holder members mounted on each of the front fork members and is inserted through the cord insertion hole defined in each of the holder members and extends out of said winker holder. Therefore, the visible exposed length of the winker cord is reduced. Thus, the winker cord has a better appearance and is better protected and is simplified in the structure of the wiring for the winker cord.

In the winker device according to the present invention the winker holder comprises two holder members disposed in front of and behind each of the front fork members and each having a side positioned outwardly of the front fork member. The winker cord extends from said one side to the other side through an annular groove of a cord insertion hole defined in one of the holder members and is exposed inwardly of the front fork member from the other side.

With this winker device, since the winker cord is exposed from the winker holder inwardly of the front fork member, the winker cord has a better appearance and is better protected.

Therefore, it is an object of the present invention to provide a vehicular light-emitting device which is capable of emitting light sideways, preventing emitted light from being applied to the driver, and also preventing rainwater from being applied directly to a light-emitting side face.

To achieve the above object, a vehicular light-emitting device includes a light-emitting device body (e.g., a light-emitting device body 694 in the embodiment) having a light-emitting front face (e.g., a light-emitting front face 690 in the embodiment) and a light-emitting side face (e.g., a light-emitting side face 691 in the embodiment) which are capable of emitting light. A cover (e.g., a cover 695 in the embodiment) is provided for covering only a portion of the light-emitting side face of the light-emitting device body.

Since the cover covers only a portion of the light-emitting side face of the light-emitting device body, the light-emitting side face which is not covered with the cover is capable of emitting light sideways. If the cover covers an upper surface of the light-emitting side face, then it prevents emitted light from being applied from the light-emitting side face to the driver, and if the cover covers an area above the light-emitting side face, then it prevents rainwater from being applied directly to the light-emitting side face.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
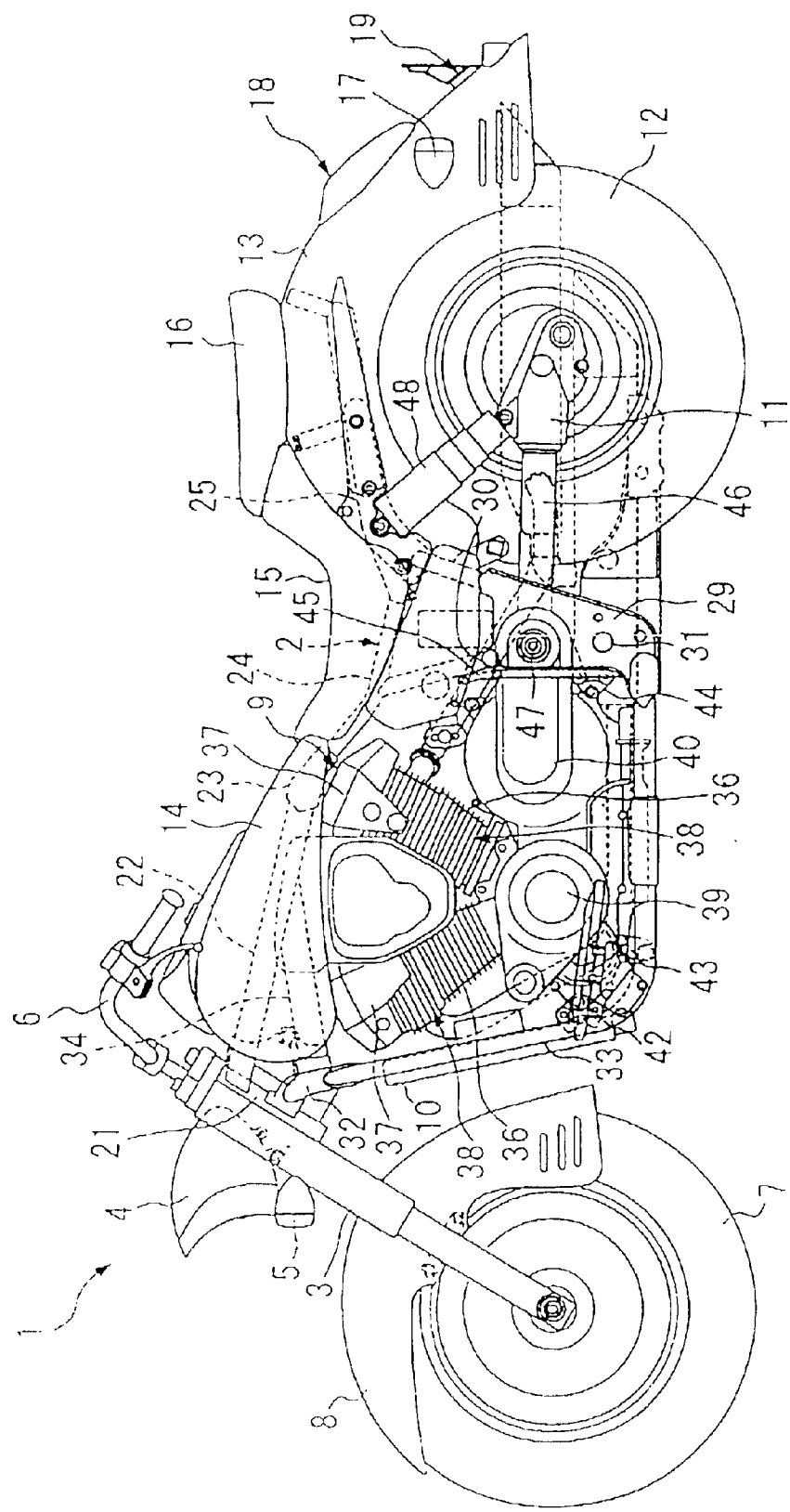
FIG. 1 is a side view showing a motorcycle according to one embodiment of the present invention.

Referring now to the drawings, an embodiment of the present invention will be described below. In the description, the terms regarding the direction such as front, rear, left, and right represent directions with respect to the vehicle body.

FIG. 1 is a side view of a general construction of a motorcycle embodying the present invention. A motorcycle 1 is commonly referred to as an American type motorcycle that includes a vehicle body frame 2 with a pair of left and right front forks 3 rotatably supported at the front end of the vehicle body frame 2. A headlight 4 is provided on the upper part of the front forks 3 with a pair of left and right front winkers 5 provided on the front forks 3 at a position lower than the headlight 4 and a steering handle 6 mounted at the upper end of the front forks 3 and disposed on the upper front of the vehicle body.

The motorcycle 1 comprises a front wheel 7 rotatably supported by the front forks 3 with a front fender 8 supported by the front forks 3 for covering the upper side of the front wheel 7. An engine 9 is supported by the vehicle body frame 2 with a radiator 10 disposed forwardly of the engine 9. Rear swing arm units 1 lare mounted on the rear portion of the vehicle body so as to be pivotable about the lateral axis by the vehicle body frame 2. A rear wheel 12 is rotatably suspended at the rear ends of the rear swing arm units 11 and are rotated by a driving force of the engine 9. A rear fender 13 is supported by the vehicle body frame 2 for covering the upper side of the rear wheel 12.

The motorcycle 1 further includes a teardrop shaped fuel tank 14 disposed on the upper part of the vehicle body frame 2 with a main seat 15 disposed rearwardly of the fuel tank 14 for the driver to sit on. A pillion seat 16 is provided rearwardly of the main seat 15 on the rear fender 13 for a fellow passenger to sit on. A pair of left and right rear winkers 17 are provided on the rear portion of the rear fender 13 with a brake lamp 18 provided at the center of the rear portion of the rear fender 13 and a license plate mounting portion 19 provided at the rear end of the rear fender 13.

Figure 2:
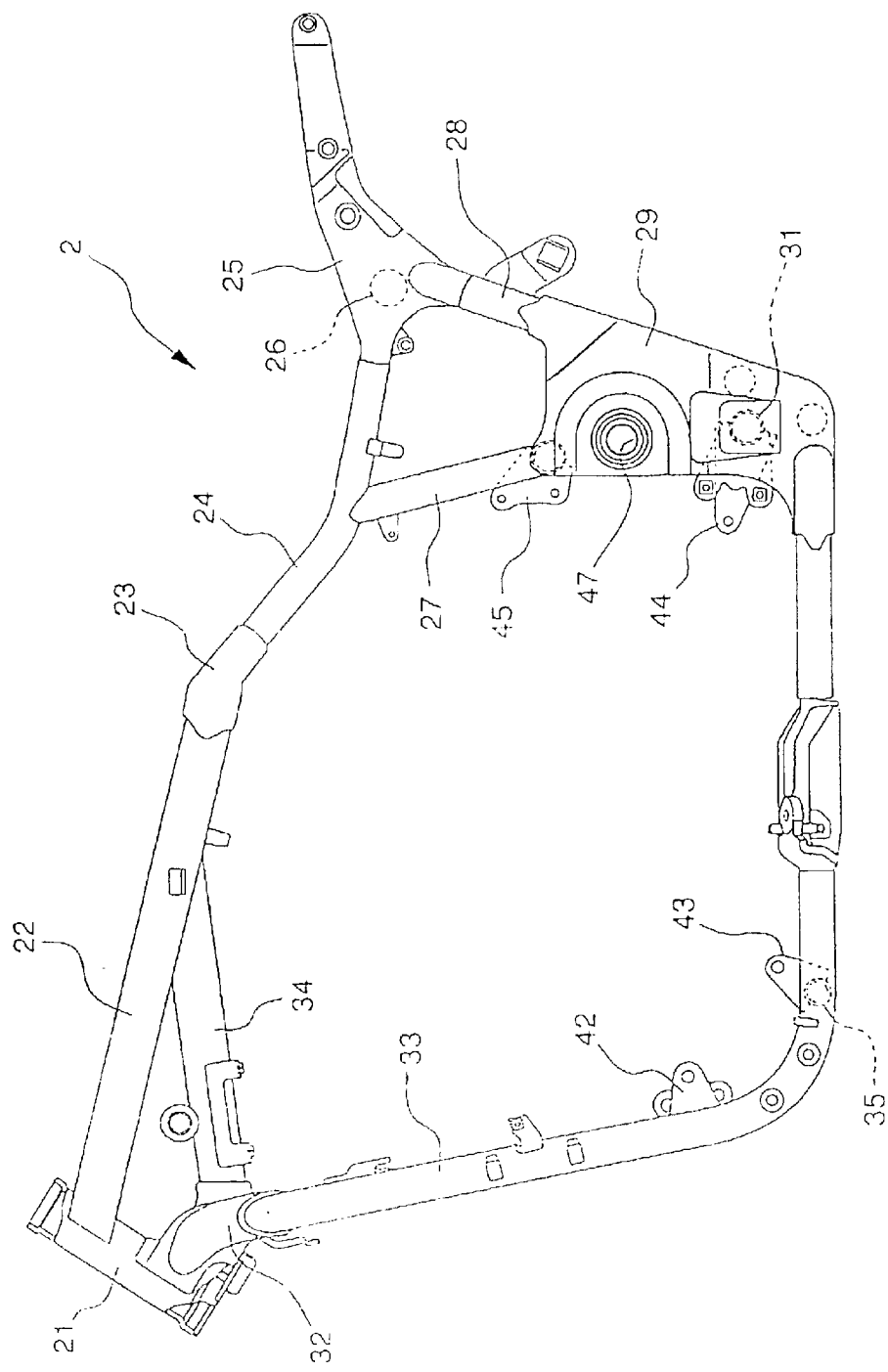
FIG. 2 is a side view showing a vehicle body frame of the motorcycle according to one embodiment of the present invention.
Figure 3:
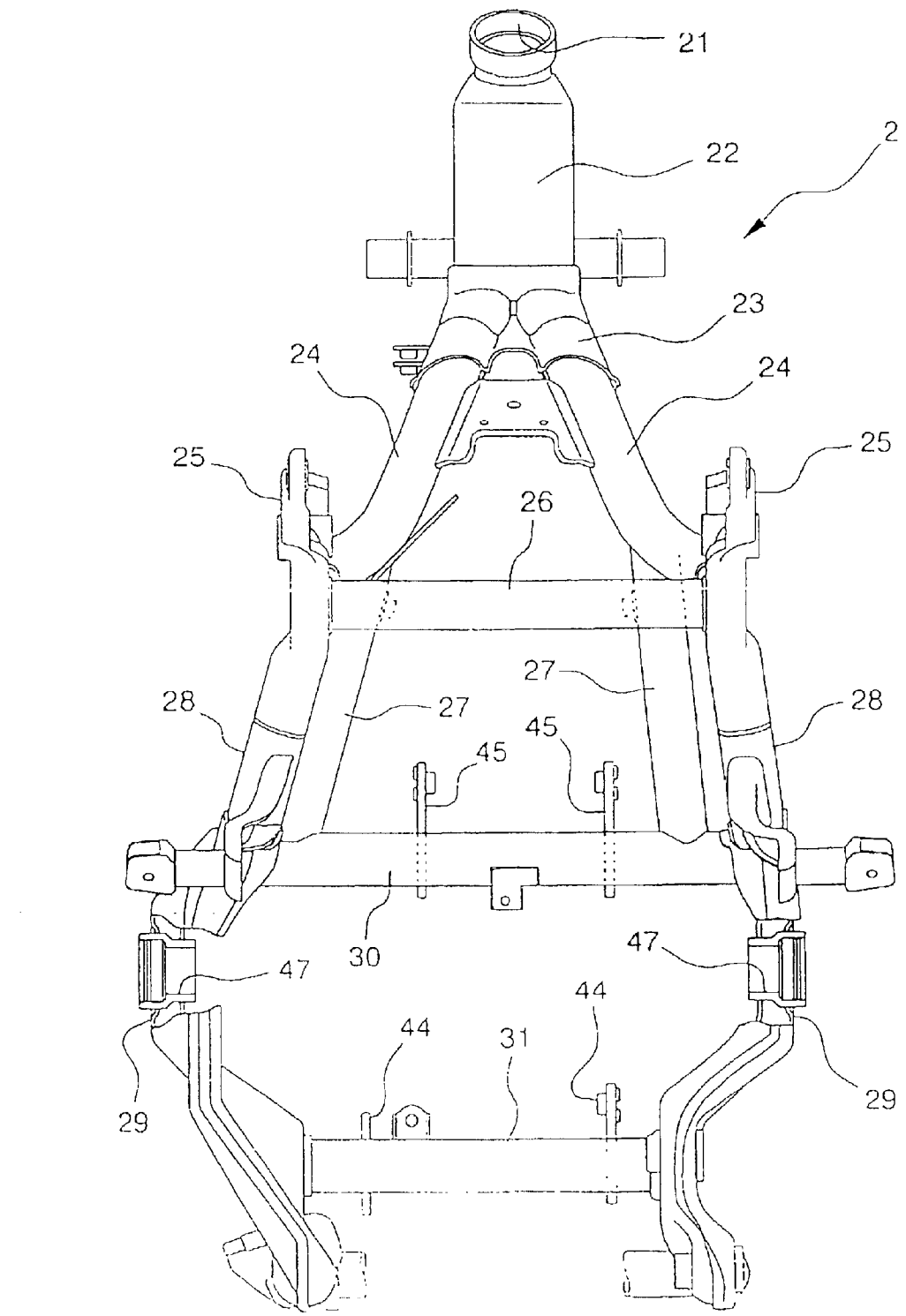
FIG. 3 is a back view showing the vehicle body frame of the motorcycle according to one embodiment of the present invention.

The vehicle frame 2, as shown in FIG. 2 and FIG. 3, includes a head pipe 21 at the front end with a main pipe 22 extending rearwardly from the upper portion of the head pipe 21. An upper pipe joint 23 is welded at the rear portion of the main pipe 22 with a pair of left and right center upper pipes 24 bifurcated from the upper pipe joint 23 to the left and right and extending rearwardly therefrom. A pair of left and right rear brackets 25 are provided for being connected to the respective center upper pipes 24 with a rear cross pipe 26 for connecting the left and right rear brackets 25 with each other. Center pipes 27 extend downwardly from the respective center upper pipes 24 with rear pipes 28 extending downwardly from the respective rear brackets 25. A pair of left and right pivot plates 29 are provided for connection to the lower side of the center pipes 27 and the rear pipes 28 with a cross pipe 30 for connecting the left and right pivot plates 29 at the upper portions thereof with each other and a cross pipe 31 for connecting the left and right pivot plates 29 at the lower portions thereof with each other. A gusset 32 is welded at the lower portion of the head pipe 21 with a pair of left and right down pipes 33 bifurcated to the left and right from the gusset 32 and extending somewhat obliquely downwardly towards the rear and then extending rearwardly in a substantially horizontal direction from the lower portion thereof to be connected to the pivot plates 29. A sub pipe 34 is provided for connecting the gusset 32 and the main pipe 22 at the lower side of the main pipe 22, and a front cross pipe 35 for connecting the left and right down pipes 33 with each other.

The engine 9 is a V-type, two-cylinder, four-cycle engine having a pair of front and rear cylinder blocks 38 provided with a cylinder head portion 37 and a cylinder portion 36, and a crankcase 39 provided downwardly of the cylinder blocks 38 so as to be continued therefrom. A transmission 40 is connected to the rear side of the crankcase 39 of the engine 9. The engine 9 and the transmission 40 are supported on the vehicle body frame 2 in such a manner that the front portion of the crankcase 39 is connected to the down pipes 33 via a bracket 42 with the midsection of the crankcase 39 connected to the front cross pipe 35 via a bracket 43 and the lower portion on the rear side of the transmission 40 connected to the cross pipe 31 via a bracket 44. The upper portion on the rear side of the transmission 40 is connected to the cross pipe 30 via a bracket 45.

The rear swing arm units 11 comprise a pair of left and right fork portions 46 extending rearwardly from the base portions of the front ends thereof, and are pivotable in the vertical direction about pivots 47 by being supported at the base portion by the pivots 47 provided on the left and right pivot plates 29. A pair of left and right rear cushion units 48 are interposed between the respective extremities of the rear swing arm units 11 and the respective rear brackets 25, so that vibration applied on the rear wheel 12 from the road surface is alleviated and absorbed.

Figure 4:
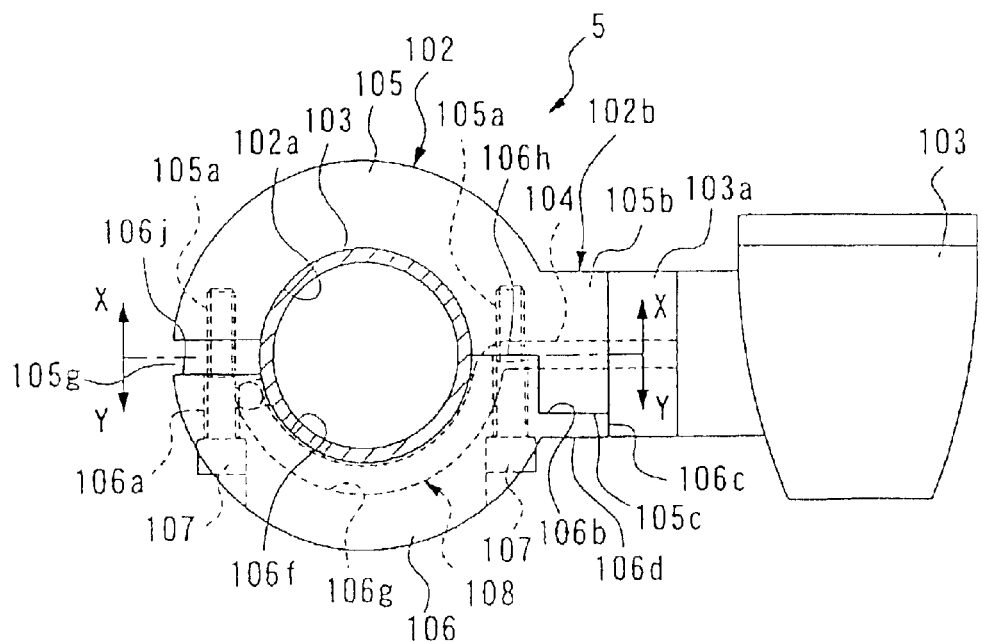
FIG. 4 is a plan view of the winker device of the motorcycle according to one embodiment of the present invention.
Figure 5:
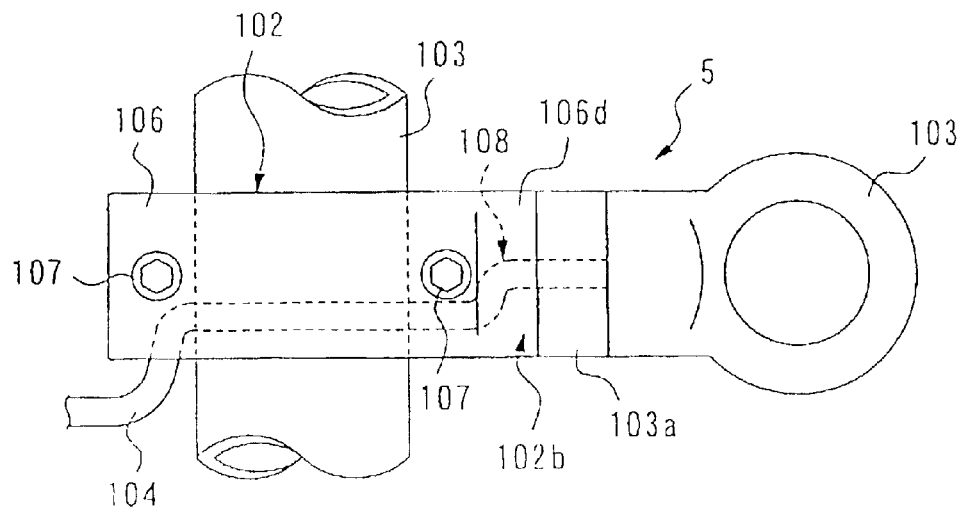
FIG. 5 is a side view of the winker device of the motorcycle according to one embodiment of the present invention.

The front winker (winker device) 5 comprises, as shown in FIG. 4 and FIG. 5, with a winker holder 102 attached on the front fork 3 of the motorcycle 1 and a winker 103 supported by the outside portion of the winker holder 102 via a winker supporting base portion 103a. A winker cord 104 extends from the winker 103 and is drawn out through the interior of the winker holder 102.

The winker holder 102 comprises a pair of holder members 105, 106 formed by dividing a cylindrical body formed with a shaft hole 102a having an inner diameter substantially the same as the diameter of the outer periphery of the front fork 3 and with a column shaped projection 102b on one side (outside) formed into substantially halves along a plane laid in the direction of the axis of the cylindrical body. The winker holder 102 is detachably mounted on the front fork 3 by disposing the respective holder members 105, 106 so as to interpose the front fork 3 therebetween from the front and back, and screwing and tightening bolts 107, 107 into the screw holes 105a, 105a formed on both sides of one of the (the front) holder member 105 through the bolt holes 106a, 106a formed on both sides of the holder member 106 on the other (the rear) holder member 106.

The projection 105b of the outer side portion of the one holder member 105 is a substantially column shaped portion having a notched plane 105c on the side of the other holder member 106, so that the winker 103 is supported by the holder member 105 by connecting the projection 105b detachably to the winker supporting base portion 103a of the winker 103 by means of a certain tightening means such as a screw or the like.

Figure 6:
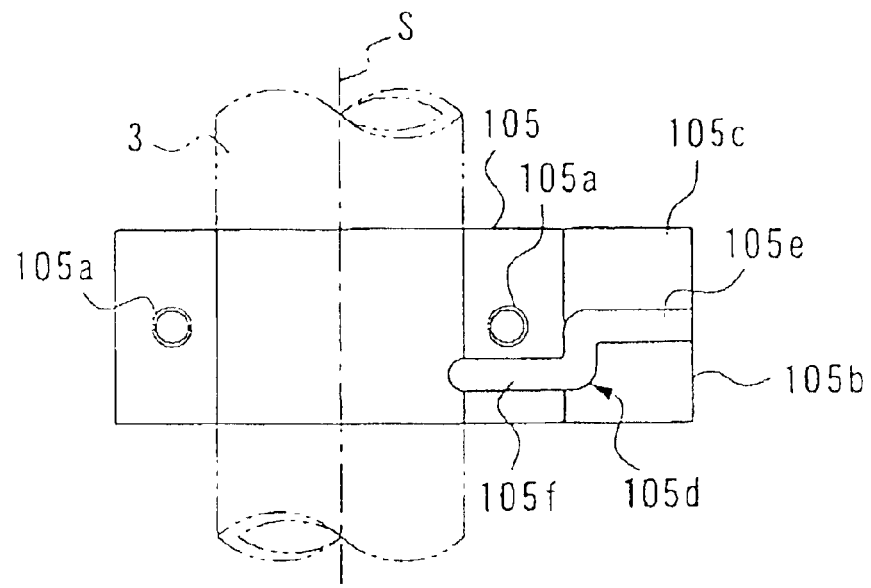
FIG. 6 is a drawing of the winker device of the motorcycle according to one embodiment of the present invention when viewed in the direction of the arrow X—X in FIG. 4.

The one holder member 105 is, as shown in FIG. 6, formed with a groove 105d of crank shape in a side view opening towards the outer end (towards the side of the winker supporting base portion 103a) and towards the other holder member 106 so as to extend along the direction of the axis of the projection 105b (the direction orthogonal to the direction S of the axis of the winker holder 102) to the proximal section of the screw hole 105a and then circumvent the screw hole 105a downwardly and continue to the inner peripheral portion being in contact with the outer peripheral surface of the front fork 3 of the holder member 105.

The portion 105f of the groove 105d positioned downwardly of the screw hole 105a is formed in a substantially semi-circular shape in lateral cross section. The groove portion 105e along the direction of the axis of the projection 105b of the groove 105d may be formed as a hole closed on the side of the other holder member 106 but not as a groove. The groove width of the groove 105d or the diameter of the hole formed instead of the groove 105d is formed so as to be slightly larger than the diameter of the winker cord 104.

Figure 7:
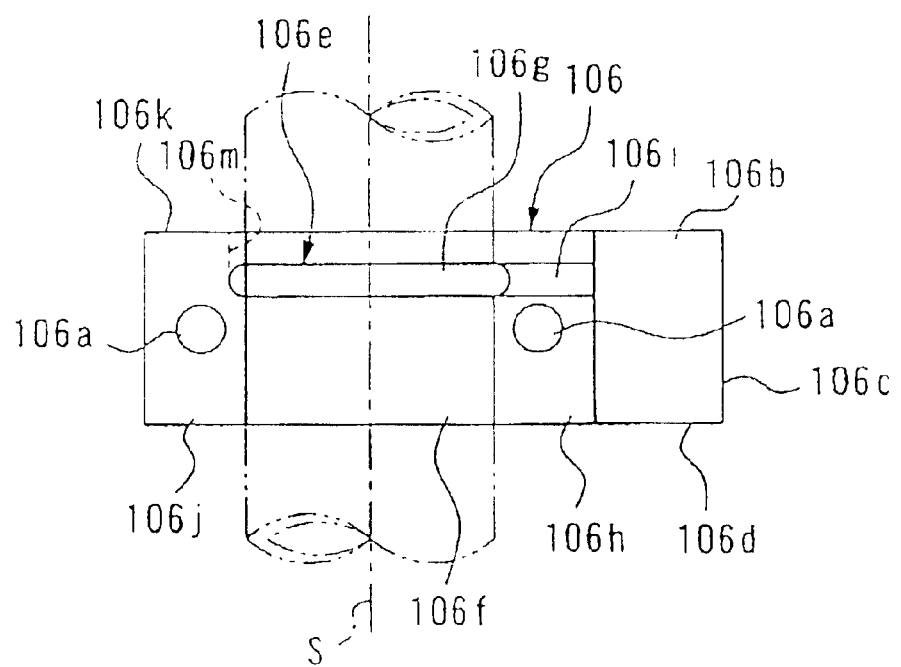
FIG. 7 is a drawing of the winker device of the motorcycle according to one embodiment of the present invention when viewed in the direction of the arrow Y—Y in FIG. 4.

The other holder member 106 is formed at the outer end (the side of the winker supporting base portion 103a) with a projection 106d forming a cylindrical projection 102b together with the projection 105b by abutting the joint surface 106b thereof against the notched plane 105c of the projection 105b of the one holder member 105 and abutting the outer end portion 106c thereof against the winker supporting base portion 103a, as shown in FIG. 7. The inner side of the other holder member 106 is formed with a groove 106e being connected into the groove portion 105f on the one holder member 105 at one end, extending in the direction orthogonal to the direction S of the shaft hole 102a of the winker holder 102, and then opening downwardly at the other end (the other side of the projection 106d).

The groove 106e comprises an annular groove 106g having dimensions slightly larger than the diameter of the winker cord 104 in depth and width and being formed circumferentially along the arcuate inner peripheral surface 106f that is to be brought into contact with the front fork 3. A groove portion 106i is connected into one end (the side where the projection 106b resides) of the annular grove 106g, formed along the contact surface 106h of the other holder member 106 that is to be brought into contact with the one holder member 105, and includes a semi-circular lateral cross section of a diameter slightly larger than the diameter of the winker cord 104. A groove portion 106m is formed at the position in the vicinity of the opposed surface 106j of the other holder member 106 that faces towards the one holder member 105 with a gap 105g interposed therebetween for connecting to the other end (the end opposite from the projection 106b) of the annular groove 106g at the upper end (lower end in FIG. 7) thereof, opening on the lower end surface (upper end surface in FIG. 7) 106k of the other holder member 106 at the lower end (upper end in FIG. 7) thereof, and having dimensions slightly larger than the diameter of the winker cord 104 in depth and width.

The groove 105d of the one holder member 105 and the groove 106e of the other holder member 106 form a cord insertion hole 108 in the winker holder 102 for receiving the winker cord 104 therethrough. The winker cord 104 is drawn out from the winker supporting base portion 103a of the winker 103 and passes through the groove portion 105e of the projection 105b to circumvent the bolt hole 105a, and passes from the groove portions 105f, 106i through the annular groove 106g, then along the outer periphery of the front fork 3 by half a round, and then through the groove portion 106m, and is pulled out from the lower end of the other holder member 106 to be wired towards the required location.

Though it is not shown, a seal is provided at the mounting section between the projection 102b (projection 105b, 106b) of the winker holder 102 and the winker supporting base portion 103a of the winker 103, so that rainwater is prevented from entering into the interior of the winker 103 through the cord insertion hole 108.

Though the front winker 5 is shown as being mounted on the pipe on the right side (the right side when viewed toward the traveling direction of the motorcycle 1) of the front fork 3, the front winker (winker device) to be mounted on the left side of the front fork 3 has the same construction as the right front winker 5 except to be symmetrical.

The license plate mounting unit 19 is provided with a license light 110 and the license plate (number plate) 111 that will be illuminated thereby.

Figure 8:
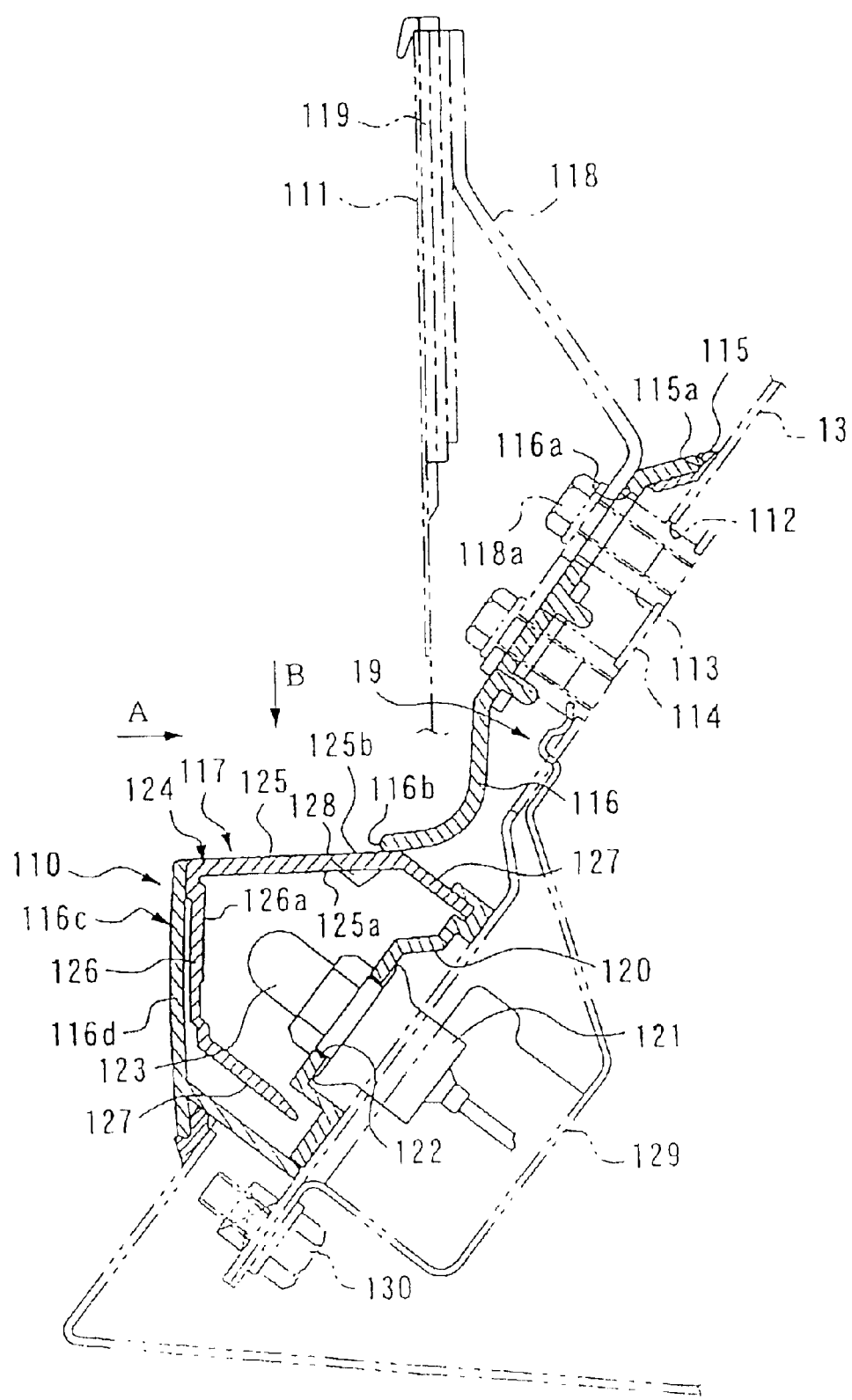
FIG. 8 is a drawing of the vertical cross-sectional view of the license light of the motorcycle according to one embodiment of the present invention.
Figure 9:
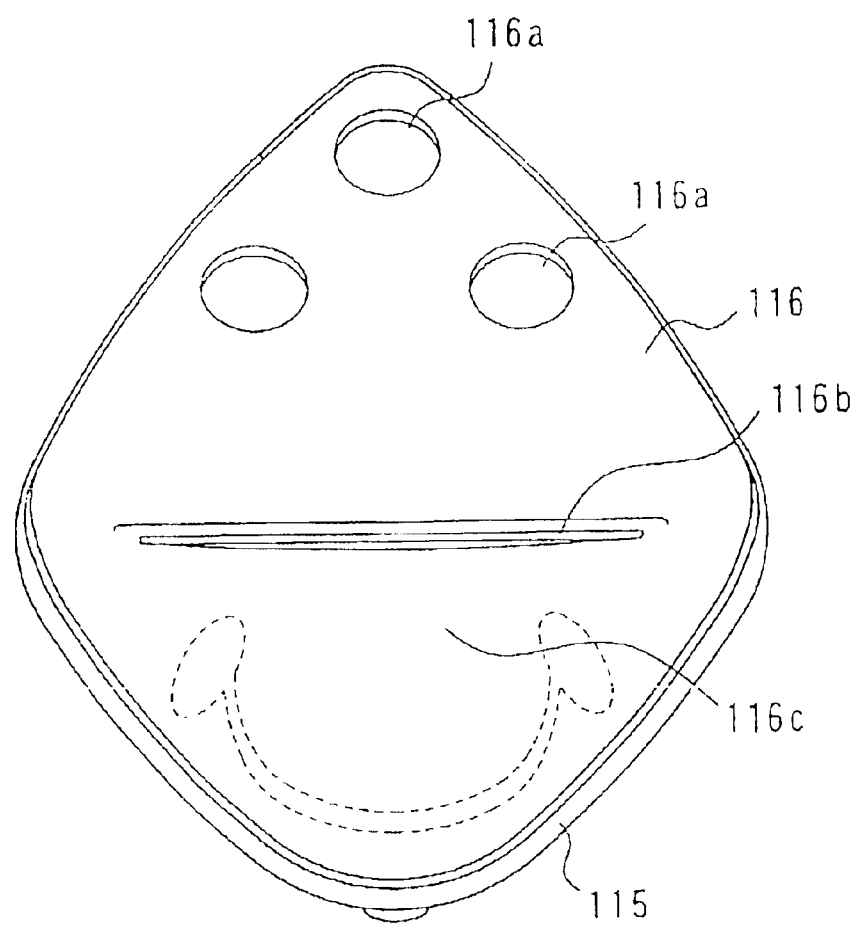
FIG. 9 is a drawing of the motorcycle according to one embodiment of the present invention when viewed in the direction (α) shown in FIG. 8.

In other words, as shown in FIG. 8, a mounting plate 114 having three female screw members 113 on the upper side thereof at the positions on the back side thereof corresponding to the substantially diamond-shaped openings 112 is fixed on the rear end portion of the rear fender 13, and a substantially diamond ring shaped cushion rubber 115 in the shape of a ring configured like a diamond is fixed on the front side so as to surround the peripheral edge of the opening 112, and then the peripheral edge of a substantially rounded diamond-shaped light cover 116 (See FIG. 9) of the license light 110 is fitted into the annular groove 115a formed along the periphery of the cushion rubber 115 so as to cover the opening 112.

The light cover 116 is provided with three insertion holes 116a through which the female screw members 113 are inserted on the upper portion thereof, and with a light storage section 116c having an opening 116b in the shape of a substantially circular arc or triangle with a rounded projection on the lower portion thereof so as to project rearwardly of the vehicle body when viewed from above. A light body 117 of the license light 110 is attached in the light storage section 116c. A mounting plate 118 is fixed to the female screw member 113 of the mounting plate 114 inserted into the insertion hole 116a of the light cover 116 with a bolt 118a, so that the number plate 111 is secured to the mounting plate 118 via a supporting plate 119.

The lamp body 117 includes a base 120, a lamp 123 alighted at its screwed portion with the socket 121 and secured to the base 120 though a bayonet mounting hole 122 formed on the base 120. A lens 124 is fixed to the base 120 so as to surround the lamp 123. The lens 124 comprises a horizontal upper surface 125 in the shape of a substantially circular arc or of a triangle having a rounded projection projecting towards the rear of the vehicle body when viewed from above. A vertical side surface 126 is connected around the upper surface 125 with the face down. A cylindrical surface 127 in the shape of a cylinder is connected along the base portions of the upper surface 125 and the side surface 126 so that the cross section taken along the centerline of the vehicle body is a substantially pentagonal shape with one side (obliquely lower side) opened. A part of the free end of the cylindrical surface 127 is joined to the surface of the base 120 by welding or the like, whereby the lens 124 is joined integrally to the base 120.

Figure 10:
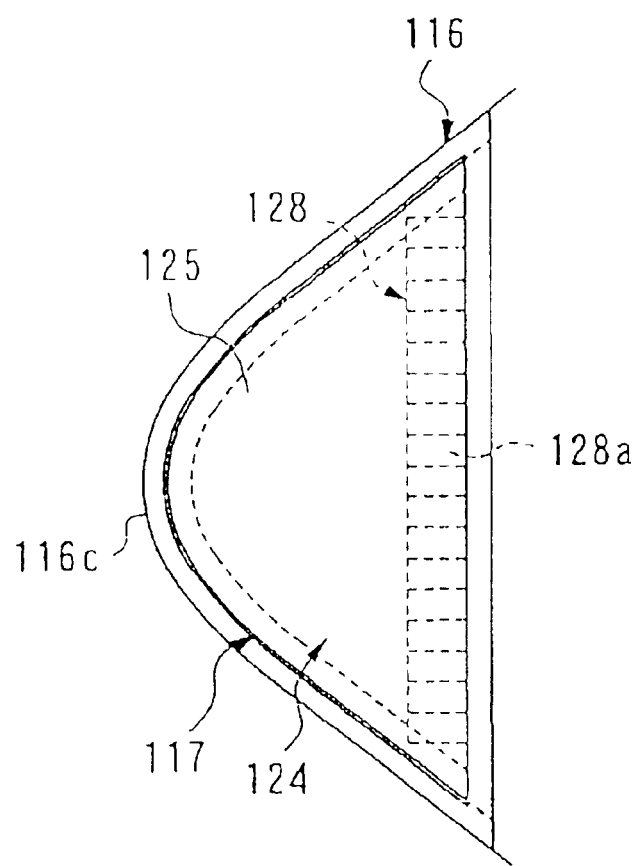
FIG. 10 is a drawing of the motorcycle according to one embodiment of the present invention when viewed in the direction (β) shown in FIG. 8.

The upper surface 125 of the lens 124 has, as shown in FIG. 10, a profile in the shape of a substantially circular arc or triangle having a rounded projection projecting towards the rear of the vehicle body when viewed from above. One of the lens surfaces 125a (the inner side being adjacent to the lamp 123) is formed with a prism 128 on the proximal side, and the other lens surface 125b (the outside being away from the lamp 123) is a smooth surface. The prism 128 includes a plurality of prism elements 128a being oriented in parallel with the centerline of the vehicle body and disposed in the direction at a right angle with respect to the centerline. Each prism element 128a is a quadrangular pyramid elongated in the fore-and-aft direction and having a top projecting towards the lamp 123, and is formed integrally with the lens surface 125a of the upper surface 125 as a so-called fish-eye cut surface.

The side surface 126 is formed into a curved surface almost along the profile of the upper surface 125, and is formed with a reflecting surface 126a applied with surface roughening for reflecting light of the lamp 123 on the upper side of the inner surface being adjacent to the lamp 123 over the range in the vicinity of the prism 128 on the curved surface.

The lamp body 117 thus constructed is mounted in the light storage section 116c by being inserted into the light storage section 116c of the light cover 116 with the projection of the lens 124 facing towards the rear of the vehicle body and the upper surface 125 facing upwardly so that the upper surface 125 is exposed from the opening 116b and the side surface 126 abuts against the back side surface of the rear wall surface 116d formed in the same curved surface as the side surface 126 of the lens 124. The lamp body 117 is secured on its side surface 126 to the back surface of the rear wall surface 116d with a bolt, not shown. A back surface cover 129 is provided for covering the socket side 122 of the lamp 123, which is inserted into and engaged with the engaging hole formed on the mounting plate 114 on the upper end side thereof and fixed to the mounting plate 114 with a bolt 130 on the lower end side thereof.

Figure 11:
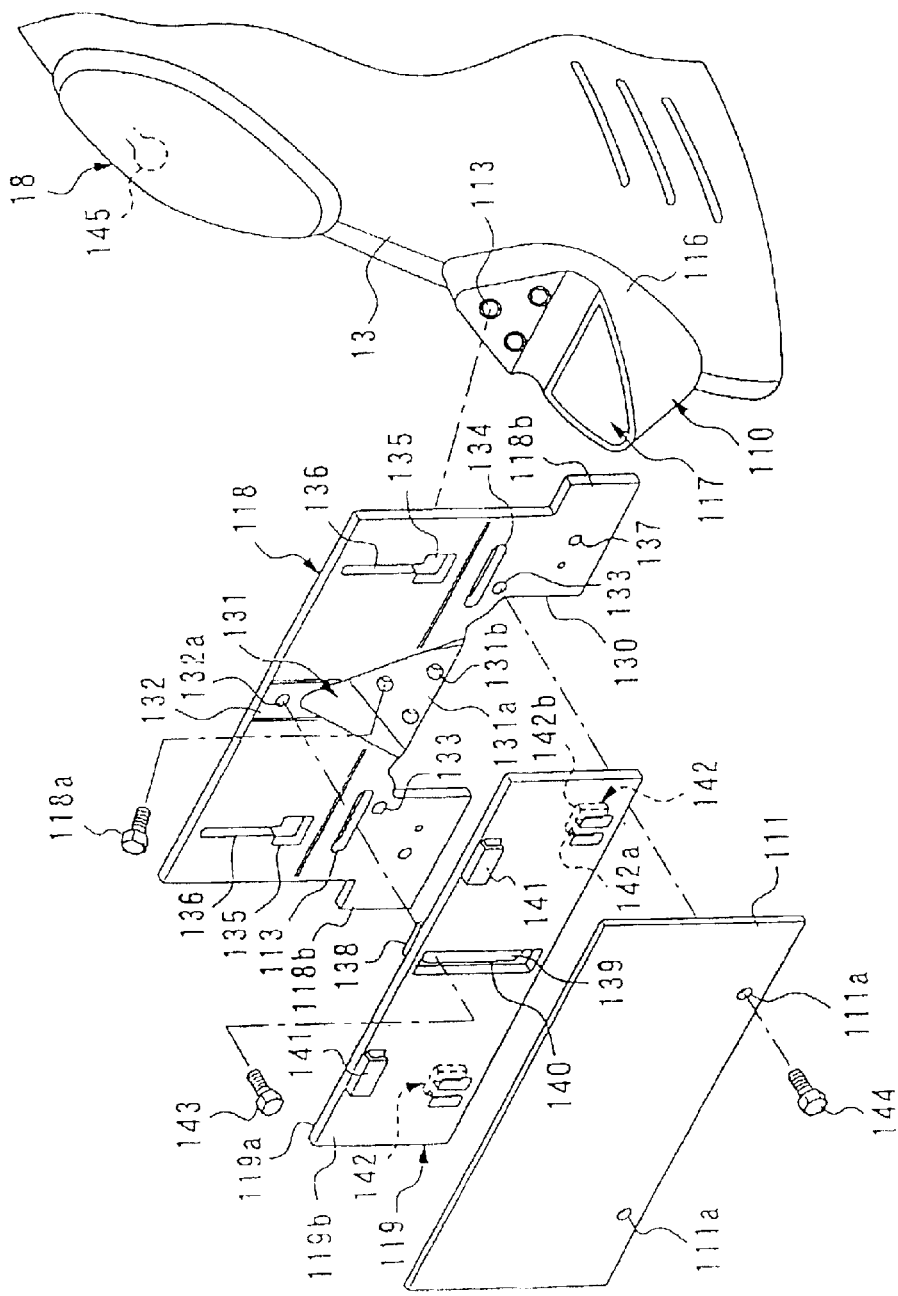
FIG. 11 is a perspective view showing the mounting structure of the license plate of the motorcycle according to one embodiment of the present invention.

Referring now to FIG. 11, the mounting plate 118 and the supporting plate 119 for mounting the license plate 111 on the license plate mounting unit 19 are described.

The mounting plate 118 is formed of a substantially rectangular plate material having overhanging portions 118b, 118b on the lower side thereof with lateral lengths slightly longer than the vertical lengths and projecting on the left and the right sides. The mounting plate 118 is formed with a substantially laterally elongated rectangular notch 130 at the center on the lower end thereof with a recess 131 in the shape of a triangular pyramid upwardly of the notch 130 and a bolt hole 132a formed in the flat recess 132 which is formed continuously upwardly from the recess 131.

A triangular mounting plate portion 131a corresponding to the bottom surface of the recess 131 in the shape of triangular pyramid is inclined so as to be higher on the front side of the vehicle body, and is formed with three bolt holes 131b near the positions corresponding to the three apexes of the triangle, so that the mounting plate 118 is attached on the license plate mounting unit 19 on the upper front of the light body 117 of the license light 110 with the plate surface oriented vertically by screwing and tightening the bolt 118a inserted through the bolt hole 131b into the female screw member 113 fixed on the mounting plate 114 of the license plate mounting unit 19 (See FIG. 8).

In addition, the mounting plate 118 is formed with bolt holes 133, 133 for mounting the license plate at symmetrical positions near the upper end of the notch 130 on both sides with laterally elongated holes 134, 134 positioned slightly upwardly thereof and holes positioned upwardly of the elongated holes 134, 134 including square holes 135, 135 at the lower sides thereof and vertically elongated slide holes 136, 136 connected to the square holes 135, 135 at the upper ends thereof and extended upwardly to the positions near the upper end of the mounting plate 118. Reflector mounting holes 137, 137 are formed at the positions lower than the bolt holes 133 on both sides of the notch 130.

The supporting plate 119 is formed of a laterally elongated rectangular plate material having the same width as the width of the upper half portion of the mounting plate 118, and formed with a projecting seat portion 138 for abutment against the rear surface of the recess 132 of the mounting plate 118 at the center of the front surface 119a thereof. A laterally elongated bolt hole 139 extends through the seat portion 138. A seat surface 140 is formed on the back surface 119b as a recess surrounding the bolt hole 139.

The supporting plate 119 is formed with a hooking strips 141, 141 on the back surface 119b on both sides at the symmetrical positions at the upper end so as to project from the back side and be bent downwardly. Engaging portions 142, 142 include a T-shaped lateral cross section on both sides at the symmetrical positions near the lower end so as to project towards the side of the front surface 119a. The engaging portions 141, 141 are square shaped in front view and are able to be inserted through the square holes 135, 135 formed on the mounting plate 118, so that the T-shape of the engaging portion 142 of the vertical portion 142a passing through the sliding hole 136 on the mounting plate 118 and the lateral portion 142b of T-shape can engage the front surface of the mounting plate 118.

With the mounting plate 118 and the supporting plate 119 thus constructed, the engaging portions 142, 142 on the supporting plate 119 are inserted through the square holes 135, 135 on the mounting plate 118 so that both plates are brought into abutment with back sides mating. Thererafter, the supporting plate 119 is slid upwardly with respect to the mounting plate 118. As a consequent, since the vertical side portion 142a of the engaging portions 142, 142 on the supporting plate 119 is inserted into the sliding holes 136, 136 of the mounting plate 118, and thus the lateral side potion 142b engages the mounting plate 118, the mounting plate 118 and the supporting plate 119 are not moved with respect to each other in the fore-and-aft direction. In this state, the height of the supporting plate 119 with respect to the mounting plate 118 is determined, and a mounting bolt 143 is inserted through the bolt hole 139 and the bolt hole 132a on the mounting plate 118 from the back side of the supporting plate 119. A nut is screwed on the front side of the mounting plate 118 for temporarily fastening for supporting the supporting plate 119 on the mounting plate 118.

Subsequently, the license plate 111 mates to the back surface of the supporting plate 119 with the upper edge abutting against the inner side of the hooking strips 141, 141 on the supporting plate 119, the bolt holes 111a, 111a formed on both sides of the lower end portion are aligned with the bolt holes 133, 133 or the elongated holes 134, 134 on the mounting plate 118, and subsequently, the mounting bolt 144 is inserted therethrough from the back side of the license plate 111, and the nut is screwed and tightened on the side of the front surface of the mounting plate 118, so that the license plate 111 is secured on the mounting plate 118.

When aligning the bolt holes 111a, 111a of the license plate 111 and the bolt holes 133, 133 or the elongated holes 134, 134 on the mounting plate 118, the supporting plate 119 is moved and adjusted in the vertical direction with respect to the mounting plate 118 via the engagement between the slide holes 136, 136 and the engaging portions 142, 142, and when those holes are aligned, the mounting bolt 143, which was inserted through the bolt hole 139 of the supporting plate 119 and the bolt hole 132a of the mounting plate 118 and fastened temporarily, is securely fastened to fixedly secure the supporting plate 119 to the mounting plate 118.

The color tones of the mounting plate 118 and the supporting plate 119 are black by using a black material or applying a black color on a suitable material. The mounting surface for the license plate constructed by combining the mounting plate 118 and the supporting plate 119 is determined to have dimensions in width and height sufficient for accommodating the license plate 111 the specification of which differs depending on the places of destination of the motorcycle. The back surface of the license plate 111 is not illuminated directly by the tail light 145 in the brake lamp unit 18 mounted on the rear fender 13 forwardly of the mounting plate 118 and the supporting plate 119.

Figure 12:
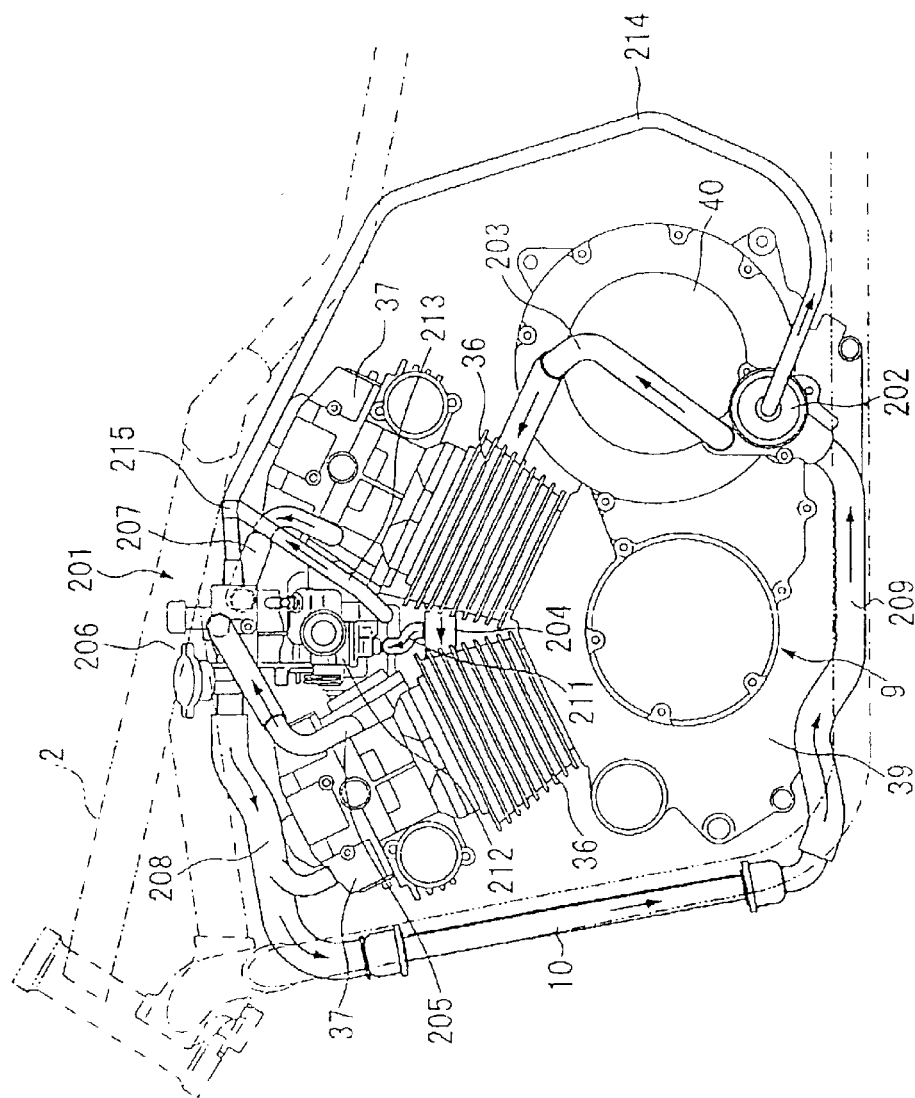
FIG. 12 is an enlarged side view with the side surface cover at the center portion of the motorcycle according to one embodiment of the present invention removed.

Engine cooling by a radiator 10 and the heating device 201 for a carburetor associated therewith will be described now. As shown in FIG. 12, a transmission 40 of the engine 9 is provided with a cooling water pump 202 on the side thereof, and an discharge port of the cooling water pump 202 is connected to an engine cooling water intake port of a right cylinder section 36 in FIG. 12 of the engine 9 through the engine cooling water wiring 203. Engine cooling water flown into the right cylinder section 36 is diverged into two routes after passing a water jacket, not shown, formed on a wall portion of the cylinder section 36. One route reaches the engine cooling water discharge port formed on the side of the cylinder section 36 opposite from the engine cooling water intake port, and the other route of which reaches the engine cooling water discharge port formed on the upper surface of the right cylinder head section 37 extending upwardly thereof.

The engine cooling water discharge port of the right cylinder section 36 is connected to the engine cooling water intake port of the left cylinder portion 36 via the engine cooling water communication pipe 204. Engine cooling water flowing into the left cylinder section 36 passes through the water jacket, not shown, formed on the wall portion of the same cylinder section 36 and then reaches the engine cooling water discharge port formed on the upper surface of the left cylinder head section 37 upwardly thereof. The engine cooling water discharge port of the left cylinder head section 37 is then connected to an intake port of a valve case of a thermostat valve 206 disposed downwardly of a main pipe 22 via an engine cooling water piping 205. On the other hand, the engine cooling water discharge port of the right cylinder head section 37 is connected to the intake port of the valve case of the thermostat valve 206 via the engine cooling water piping 207.

The discharge port of the thermostat valve 206 is connected to the upper intake port of the radiator 10 via the engine cooling water piping 208, and the lower discharge port of the radiator 10 is connected to the suction opening of the cooling water pump 202 via the engine cooling water piping 209.

A carburetor heating piping 211 is bifurcated from the engine cooling water communication pipe 204 connecting the left and the right cylinder sections 36, 36, and the extremity of the carburetor heating piping 211 is connected to the engine cooling water intake port formed on the carburetor 212. A carburetor heating piping 213 extends from the engine cooling water discharge port provided on the carburetor 212, and this carburetor heating piping 213 located on the downstream side is connected to the by-pass piping 214 for connecting the discharge port of the valve case of the thermostat valve 206 and the suction opening of the cooling water pump 202 via a junction 215.

The engine cooling water piping 203, the engine cooling water communication pipe 204 and the engine cooling water piping 205, 207, 208, 209 constitute a radiator piping that is a circulation route connecting the engine 9 and the radiator 10. The inner diameters of the engine cooling water piping 208, 209 of this radiator piping are determined to be larger than the inner diameter of the by-pass piping 214.

The thermostat valve 206 is opened and closed according to the temperature of engine cooling water flowing therein, and for example, when it is "closed," the engine cooling water piping 205, 207 is not brought into communication with the engine cooling water piping 208, but is brought into communication only with the by-pass piping 214. When the thermostat is "opened," the engine cooling water piping 205, 207 are brought into communication both with the engine cooling water piping 208 and the by-pass piping 214.

Though the cooling water pump 202 is actuated with actuation of the engine 9, the thermostat valve 206 is kept closed when the temperature of engine cooling water does not reach the prescribed temperature. Thus, engine cooling water circulates the route from the cooling water pump 202 through the engine cooling water piping 203, the left and right cylinder sections 36, the engine cooling water piping 205, 207, the valve case of the thermostat valve 206 and the by-pass piping 214 and flows back again to the cooling pump 202.

In this case, when suitably heated engine cooling water after passing the right cylinder section 36 passes through the engine cooling water communication pipe 204, a part of it is diverged and led through the carburetor heating piping 211 to the carburetor 212 to heat up the carburetor 212. Engine cooling water that was used for heating up passes through the carburetor heating piping 213 and the by-pass piping 214 and then flows back again to the cooling water pump 202.

Subsequently, when the temperature of engine cooling water increases and exceeds a prescribed temperature, the thermostat valve 206 opens. Accordingly, the route from the engine cooling piping 205, 207 through the engine cooling water piping 208 to the radiator 10, and from there through the engine cooling water piping 209 back to the cooling water pump 202 again is opened, and thus engine cooling water circulates also into this route. In other words, engine cooling using the radiator 10 is started.

In this case, the flow rate of engine cooling water flowing through the by-pass piping 214 decreases due to piping resistance, and thus the flow rate of engine cooling water flowing in the route passing through the radiator 10 side (radiator piping system) increases. Therefore, the flow rate of engine cooling water flowing through the carburetor 212 decreases consequently, and thus excessive heating of the carburetor 212 is prevented.

Figure 13:
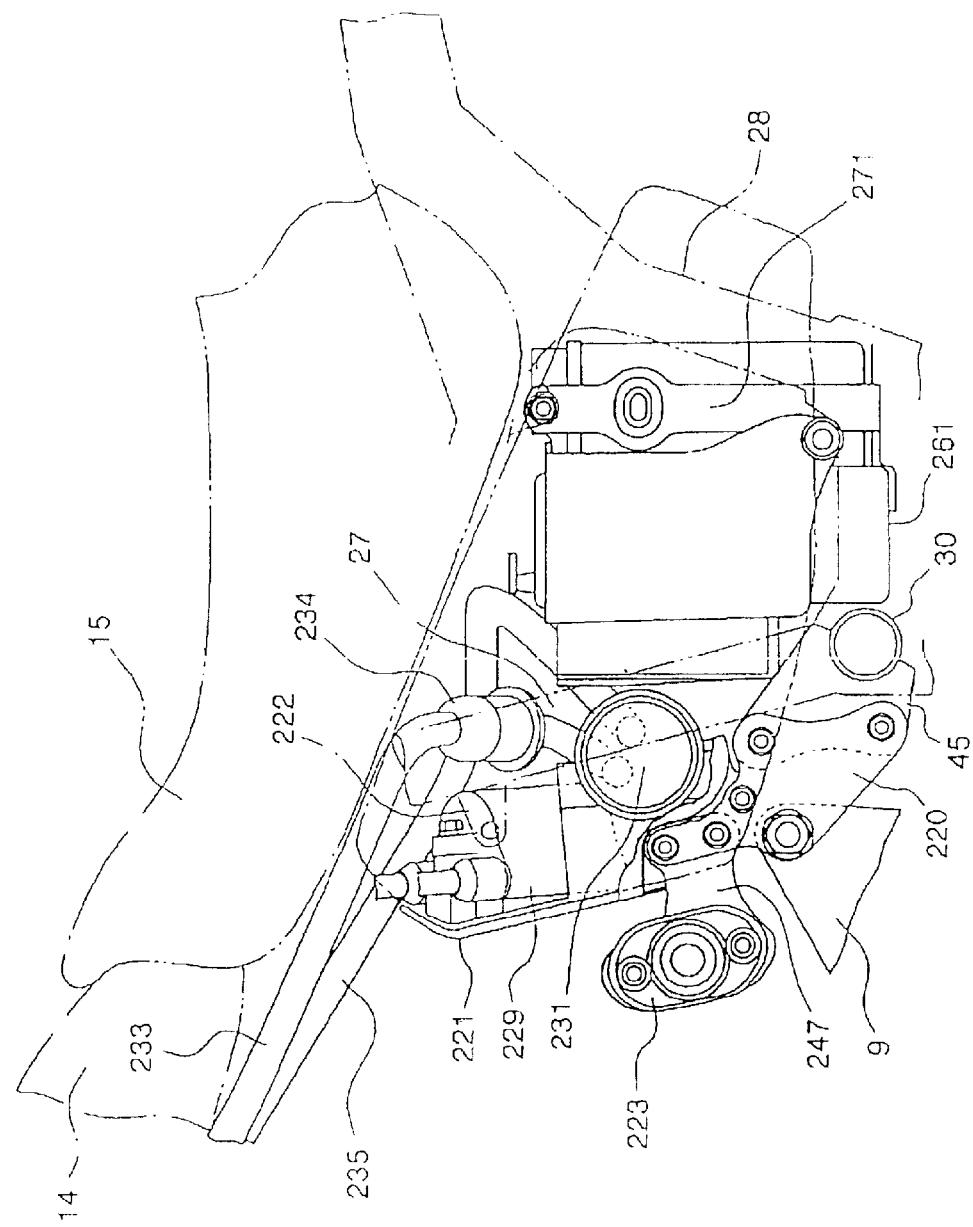
FIG. 13 is an enlarged side view with the side surface cover at the center portion of the motorcycle according to one embodiment of the present invention removed.

The arrangement structure of the engine auxiliary equipment at substantially the center of the vehicle body and the mounting structure of the ignition switch will now be described. As shown in FIG. 13, the bracket 45 mounted on the cross pipe 30 of the vehicle frame 2 is attached with an engine hanger 220 for supporting the engine 9 so as to cross over a pair of left and right pipe members 24, 27 of the vehicle body frame 2. A center cover 221 is supported and mounted on the left and right center pipes 30 on the front side thereof via the engine hanger 220 and the bracket 222 mounted on the center pipe 27 (See FIG. 17).

The engine hanger 220 has a function to support the engine 9 and the center cover 221, as well as the ignition switch 223. This will be described later in detail.

Figure 15:
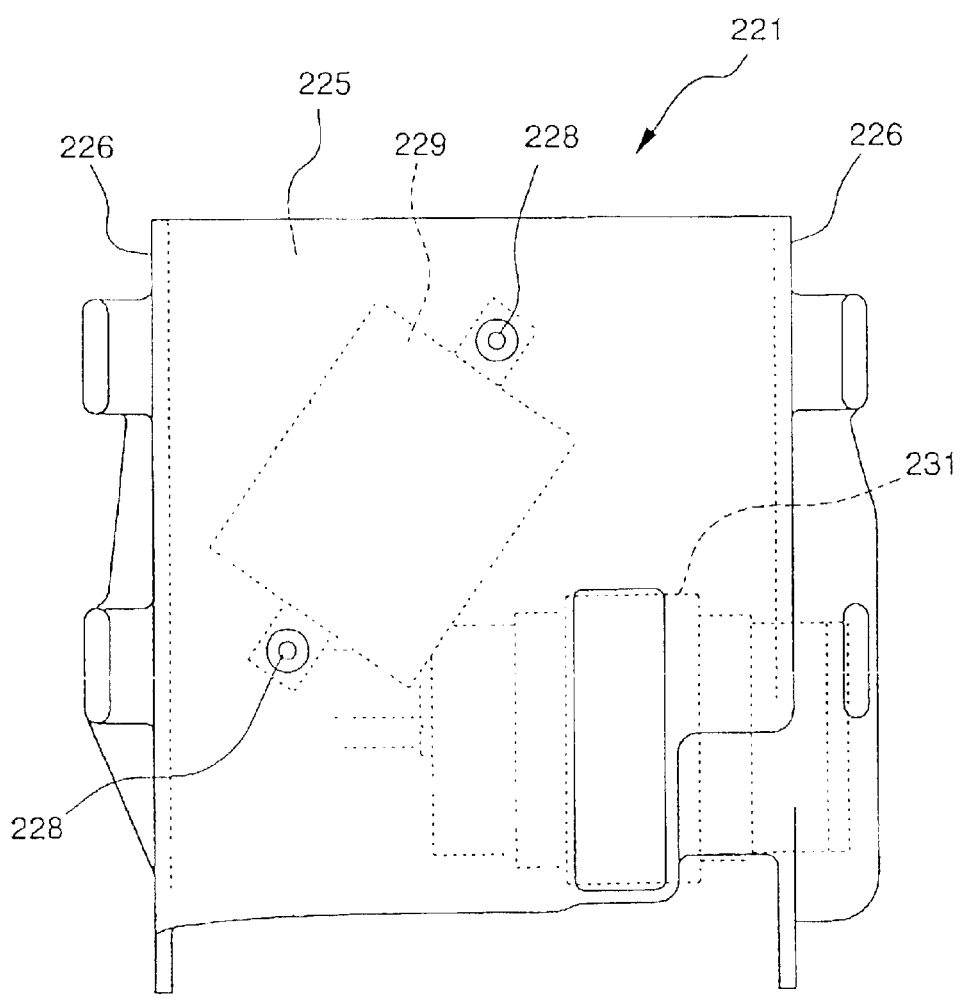
FIG. 15 is a front view of the center cover of the motorcycle according to one embodiment of the present invention.
Figure 16:
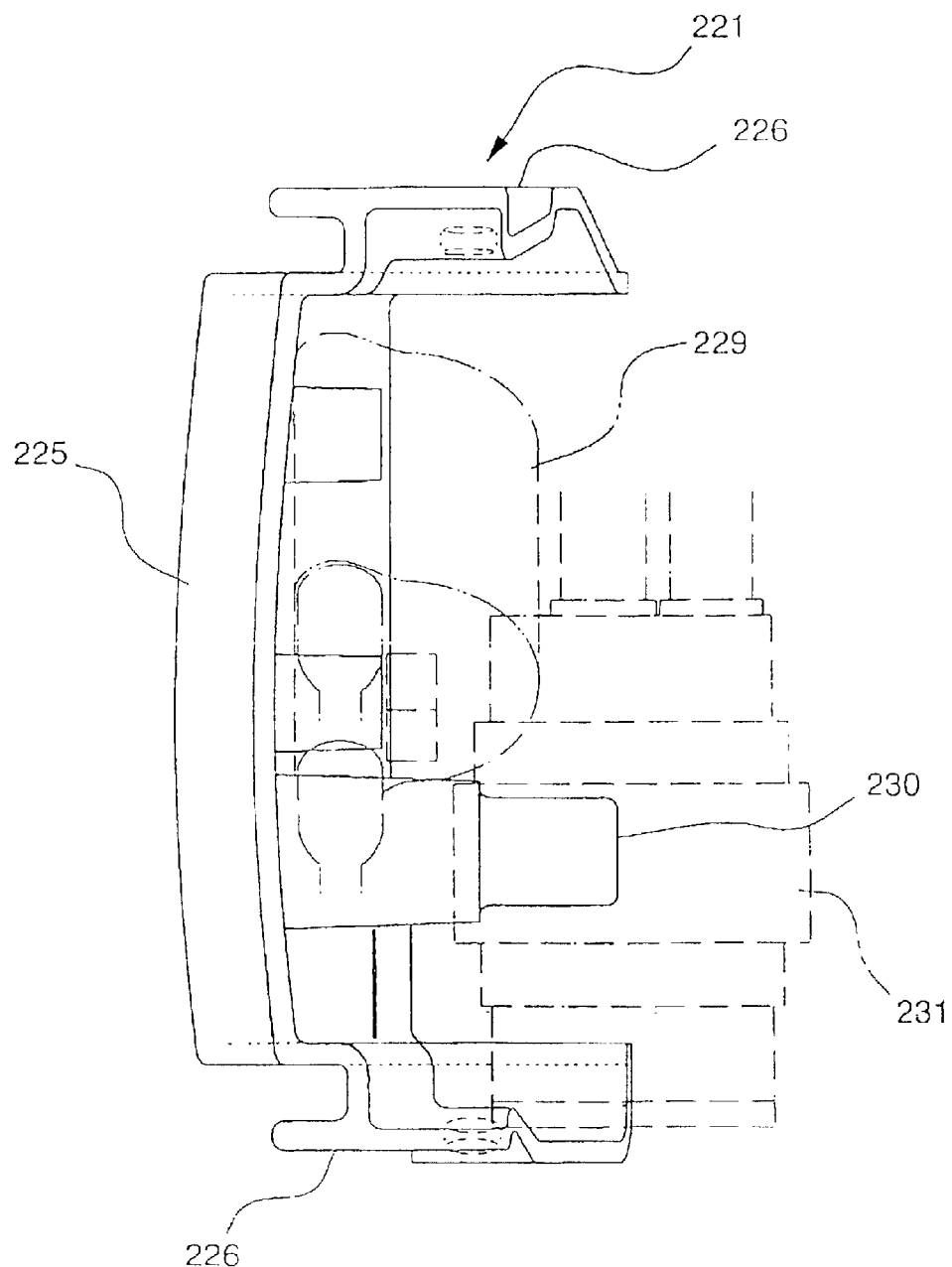
FIG. 16 is a plan view of the center cover of the motorcycle according to one embodiment of the present invention.
Figure 17:
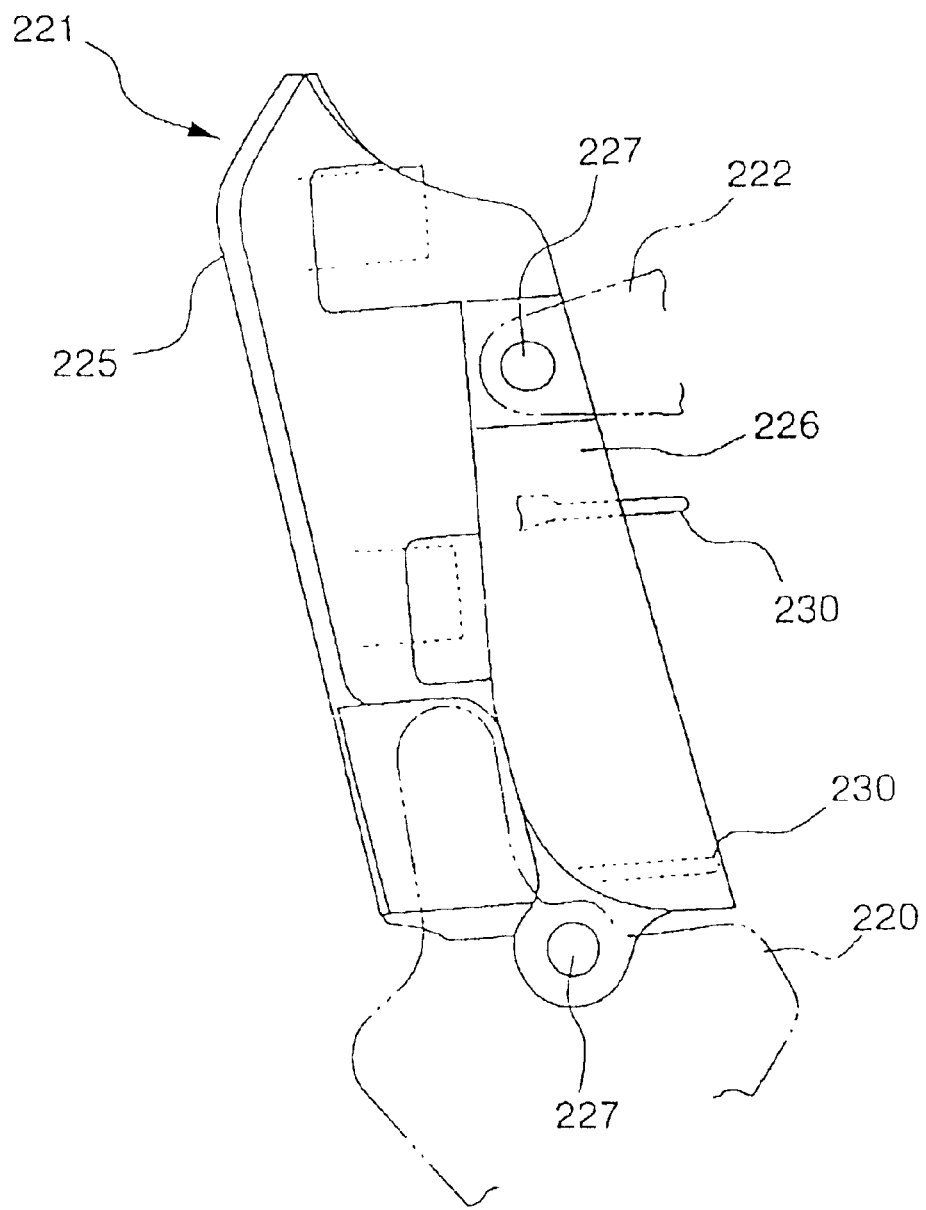
FIG. 17 is a side view of the center cover of the motorcycle according to one embodiment of the present inventionl.

The center cover 221 is, as shown in FIG. 15 to FIG. 18, formed of resin having a plate shaped portion 225 formed into the substantially square shape, and an upright portion 226 provided on the left and right sides of the plate shaped portion 225 so as to extend rearwardly with respect to the vehicle body when the center cover 221 is assembled to the vehicle body frame. The left and right upright portions 226 are, as shown in FIG. 17, provided respectively with engaged holes 227 one over another, by tightening suitable fixing means such as bolts with the engaged holes 227 aligned with the engaging holes formed on the engine hanger 220 and on the bracket 222, whereby the center cover 221 is secured on the vehicle body frame 2.

The center cover 221 is not limited to resin, and may be metal such as an aluminum alloy or the like.

Figure 18:
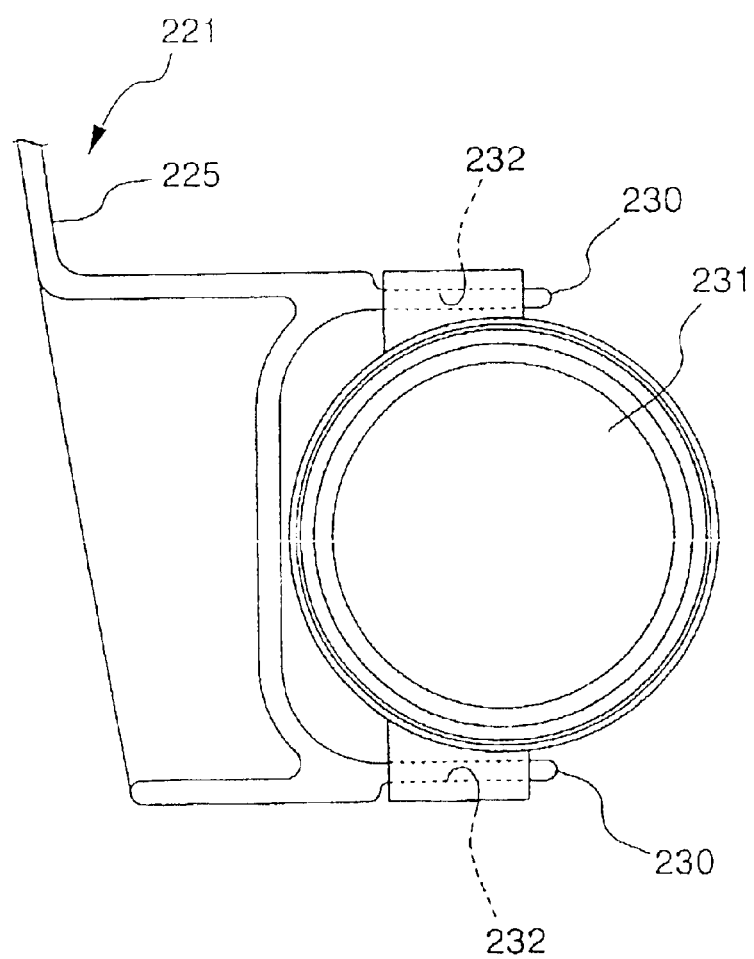
FIG. 18 is a side view showing a state in which a fuel pump is attached on the center cover of the motorcycle according to one embodiment of the present invention.

As shown in FIG. 15, the center cover 221 is formed with two part mounting holes 228 on the upper part of the plate shaped portion 225 at a certain distance with each other. An ignition coil 229 is mounted to the part mounting holes 228 via fixing means such as bolts. As shown in FIG. 16 to FIG. 18, the lower part of the plate shaped portion 225 is formed with tongue shaped engaging portions 230 extending rearwardly with respect to the vehicle body at a certain distance with respect to each other in the vertical direction. With the tongue shaped engaging portion 230 inserted into and engaged with the engaging holes 232 formed on the sides of the fuel pump 231, the fuel pump 231 is mounted on the center cover 221 in a horizontal posture.

As illustrated in FIG. 13, pipe 233 is provided for feeding fuel from the fuel tank 14 through the filter 234 to the fuel pump 231. A pipe 235 is provided for feeding fuel from the fuel pump 231 to the carburetor 212.

Figure 19:
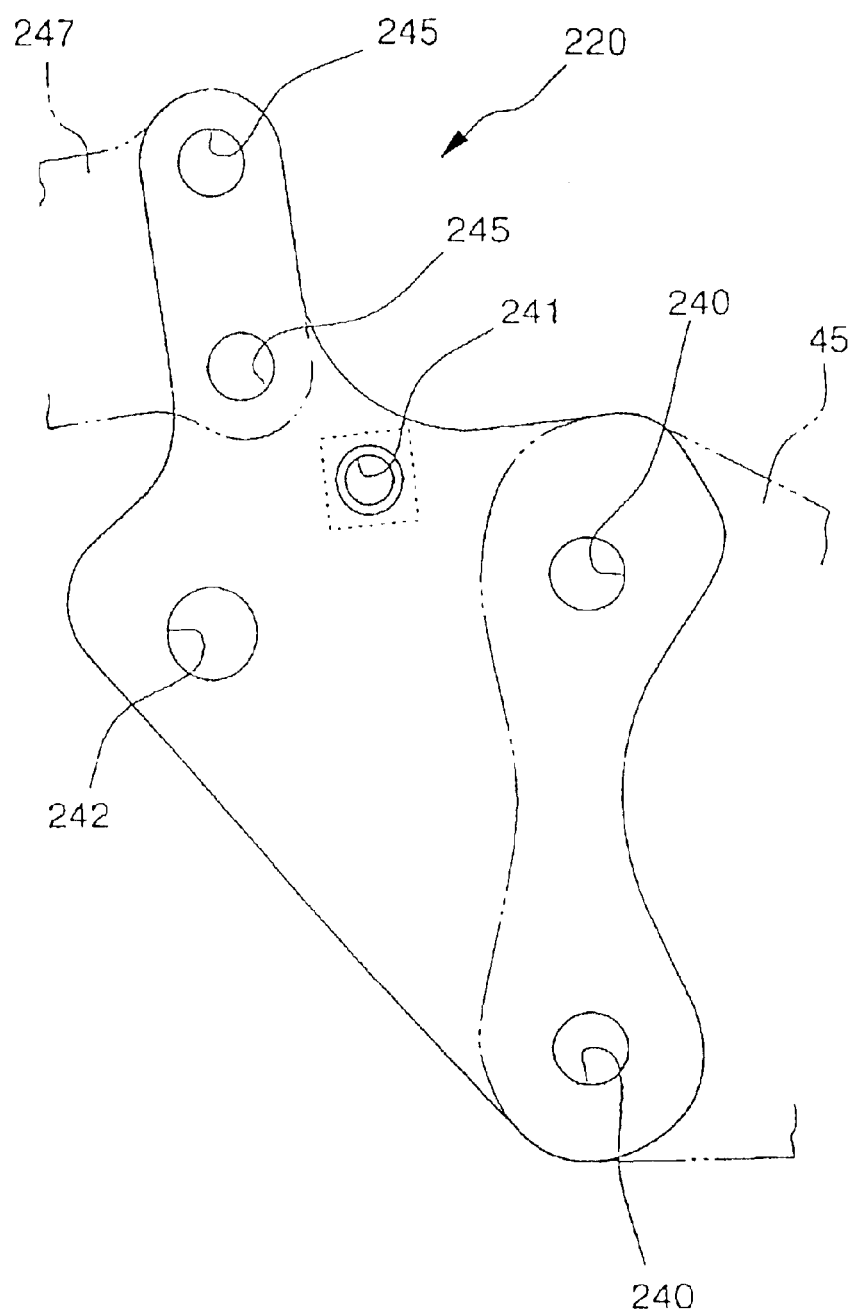
FIG. 19 is a front view of the engine hanger of the motorcycle according to one embodiment of the present invention.

The engine hanger 220 is, as shown in FIG. 19, formed into a substantially diamond shape, and is formed with engaged holes 240 in the vertical direction at a prescribed distance in the vicinity of the end portion of the right side (rearwardly of the vehicle body when being assembled to the vehicle body). FIG. 19 also illustrates an engaging hole 241 at the upper center thereof, and an engaging hole 242 in the vicinity of the left end. The engaged holes 240 is a portion to be fixed via fixing means such as bolts in a state of being aligned with the engaging holes of the bracket 45 mounted on the cross pipe 30 of the vehicle body frame 2. The engaging hole 241 is a portion to engage the lower portion of the center cover 221 via suitable fixing means such as a bolt. The engaging hole 242 is a portion to engage the engine 9 via fixing means such as a bolt.

The engine hanger 220 is provided with an extended portion 244 extending in a direction different from the direction of engine suspension (upwardly in FIG. 19). This extending portion 244 is formed with two engaging holes 245 spaced at a distance in the direction of the length. The ignition switch 223 is mounted via a stay 247 to the engaging holes 245 (See FIG. 13).

Figure 20A:
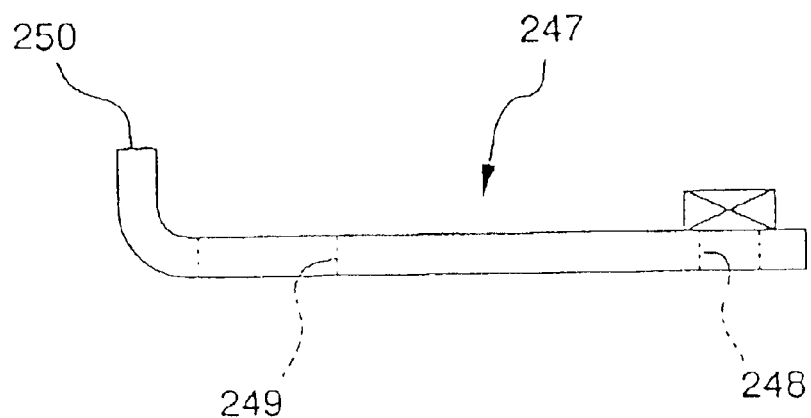
FIGS. 20(a) and 20(b) are a plan view and a side view of a stay for supporting an ignition switch of the motorcycle according to one embodiment of the present invention.
Figure 20B:
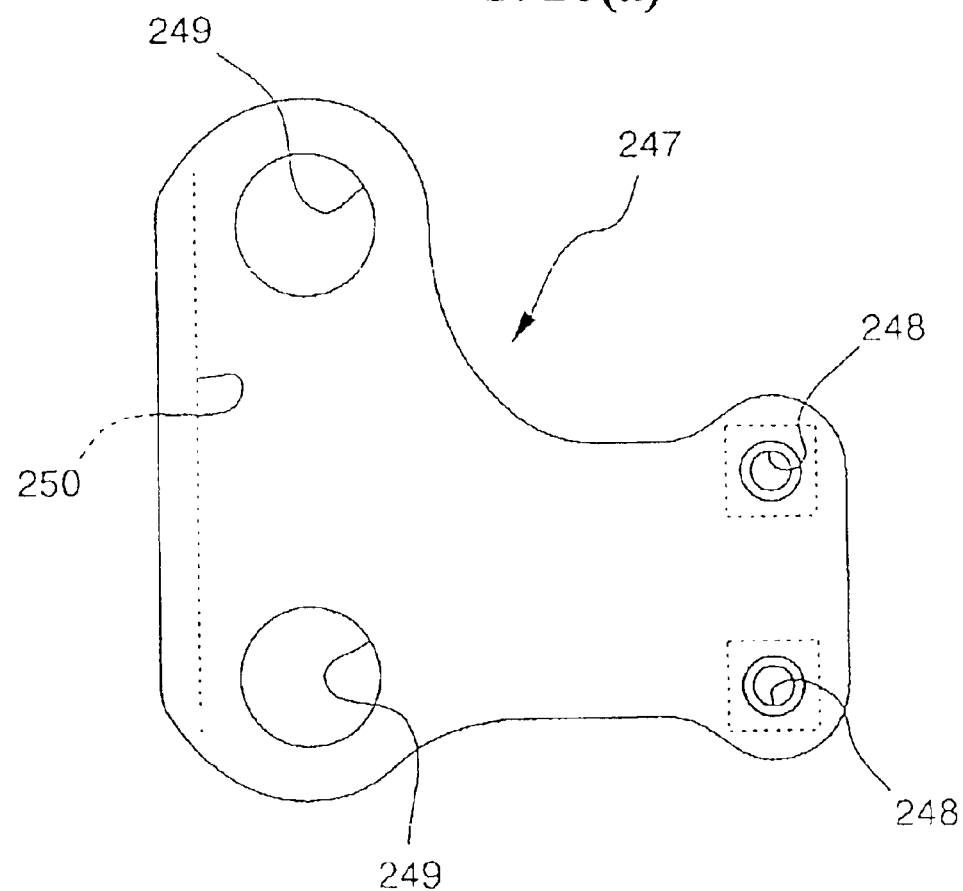

The stay 247 is, as shown in FIGS. 20(a) and 20(b), formed with engaged holes 248 to be fixed on the engine hanger 220 at a distance in the vertical direction in the vicinity of the right end (rearwardly when being assembled), and with engaging holes 249 to be aligned with the mounting hole for the ignition switch 229 at a position in the vicinity of the left end. Further, a reinforcing portion 250 is formed by bending the left edge inwardly so as to be upright when assembling the vehicle body.

The engaged holes 248 of the stay 247 correspond to the engaging holes 245 of the engine hanger 220.

Figure 14:
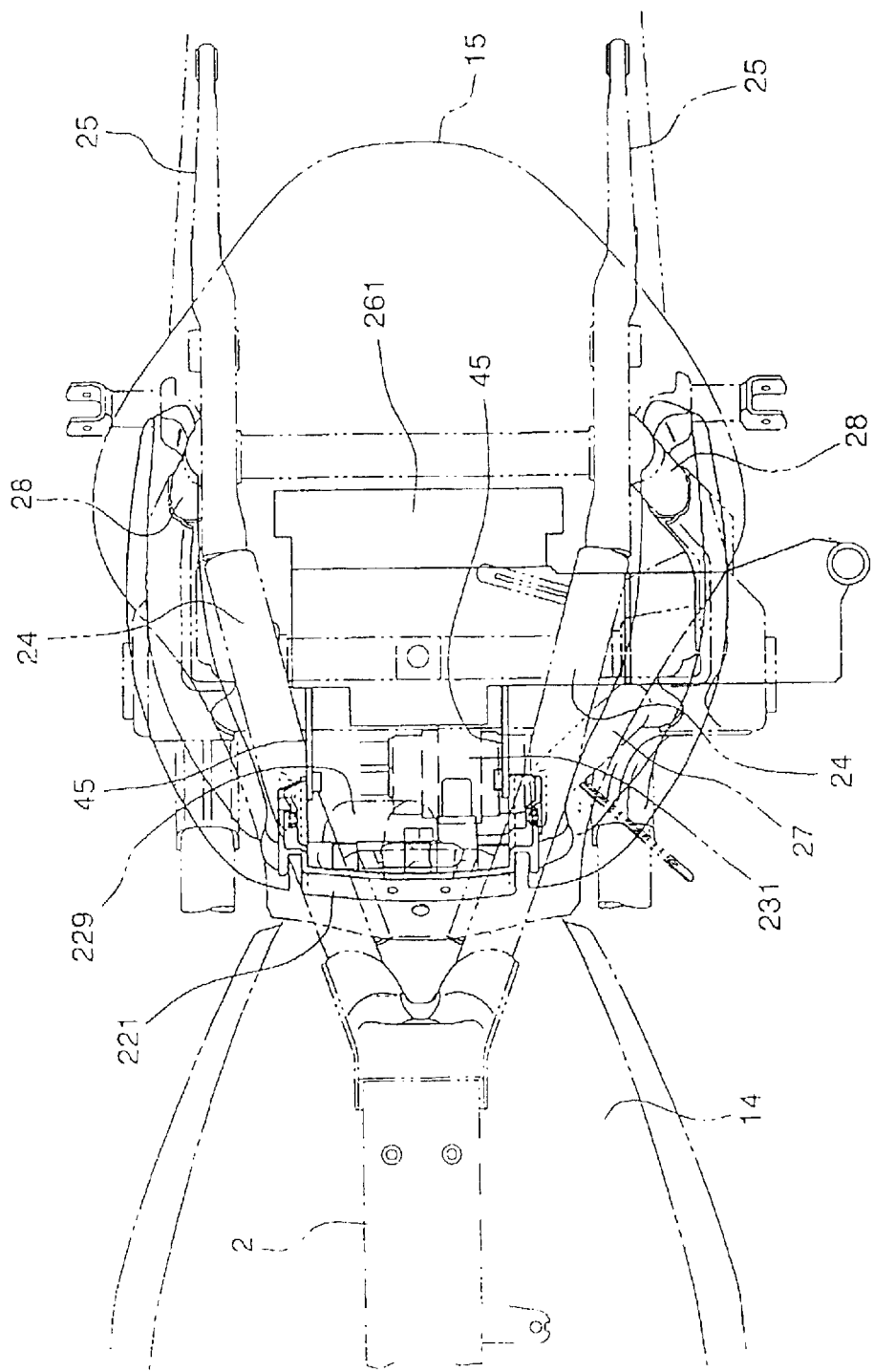
FIG. 14 is an enlarged plan view with the seat at the center portion of the motorcycle according to one embodiment of the present invention removed.

Subsequently, the storage structure for documents or tools will be described. As shown in FIGS. 13 and 14, a battery case 261 is stored rearwardly of the center cover 221 in the portion surrounded by the center pipes 27, the rear pipes 28, and main seat 15 of the vehicle body frame 2.

The battery case 261 comprises, as shown in FIGS. 21 to 24(c), a document/tool storage section 263 for storing documents and tools in addition to a battery storage section 262 for storing a battery formed integrally therewith. In other words, in the battery case 261, the right side in FIG. 21 and FIG. 22 (rear side when assembling the vehicle body) is used as the battery storage section 262 and the front side thereof is used as the document/tool storage section 263.

Figure 24A:
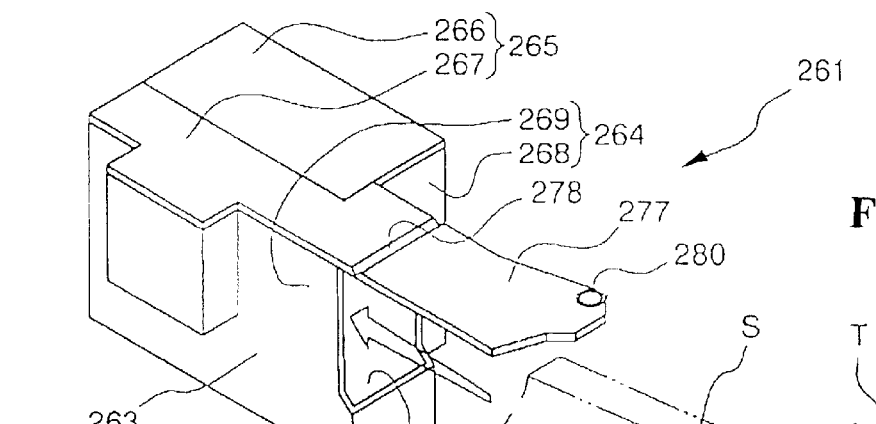
FIGS. 24(a), 24(b) and 24(c) are perspective views illustrating the action of the battery case of the motorcycle according to one embodiment of the present invention.
Figure 24B:
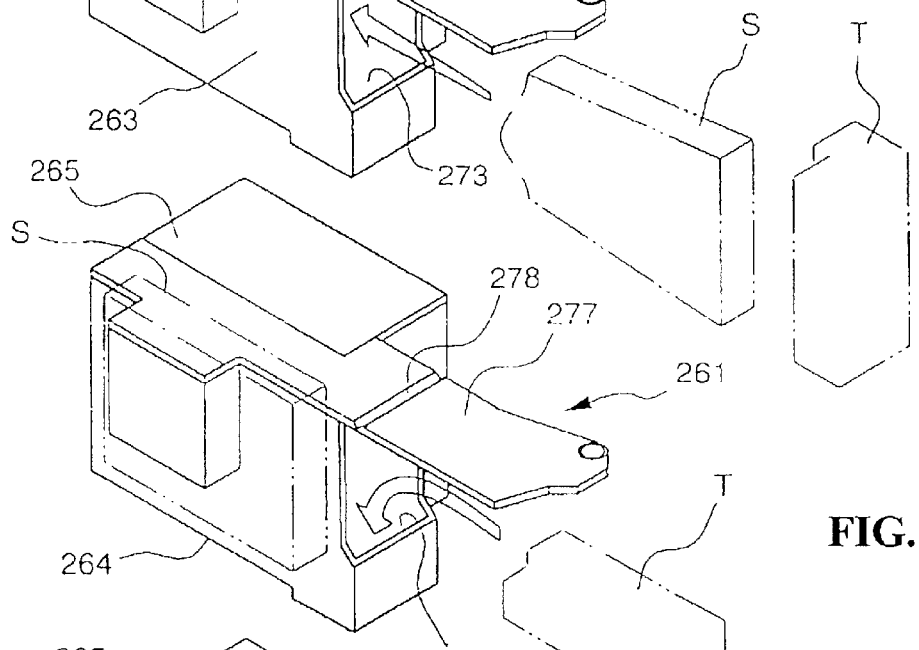
Figure 24C:
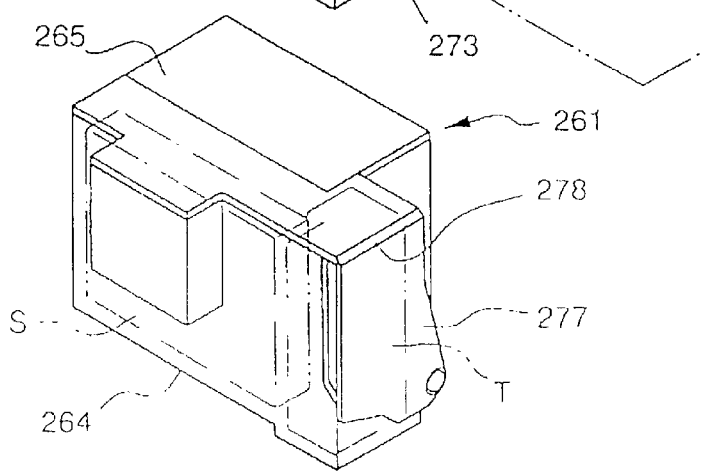

The battery case 261 comprises, as shown in FIGS. 24(a) to 24(c), a case body 264 on the lower side and a lid 265 to be fixed on the case body 264 by a suitable fixing means so as to cover the open-top of the case body 264. The lid 265 further includes the first lid 266 and the second lid 267 so as to cover the top of the battery storage section 262 and the top of the document/tool storage section 263, respectively. The case body 264, the first lid 266 and the second lid 267 are formed of resin by blow molding.

Figure 21:
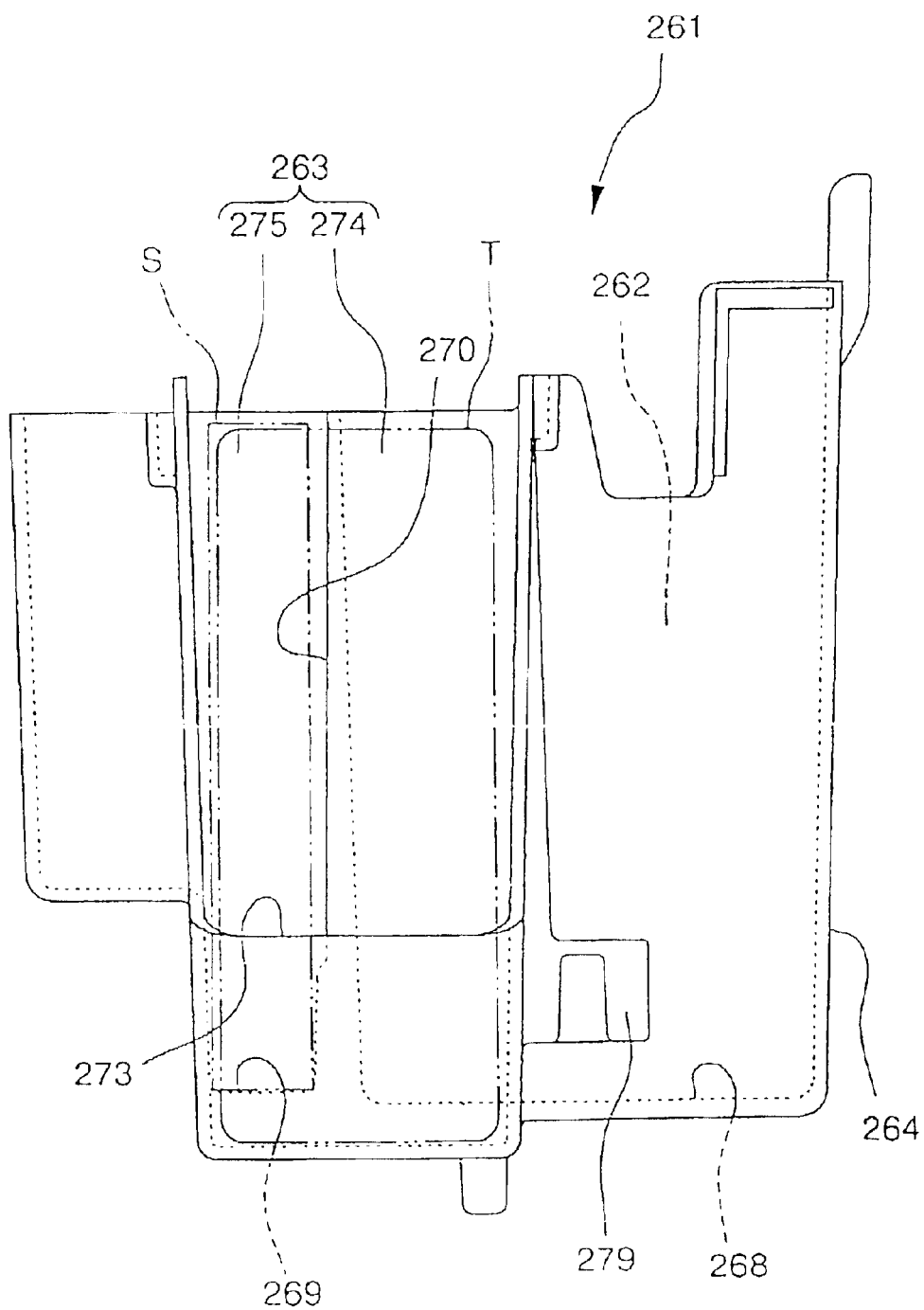
FIG. 21 is a front view of the battery case of the motorcycle according to one embodiment of the present invention.
Figure 22:
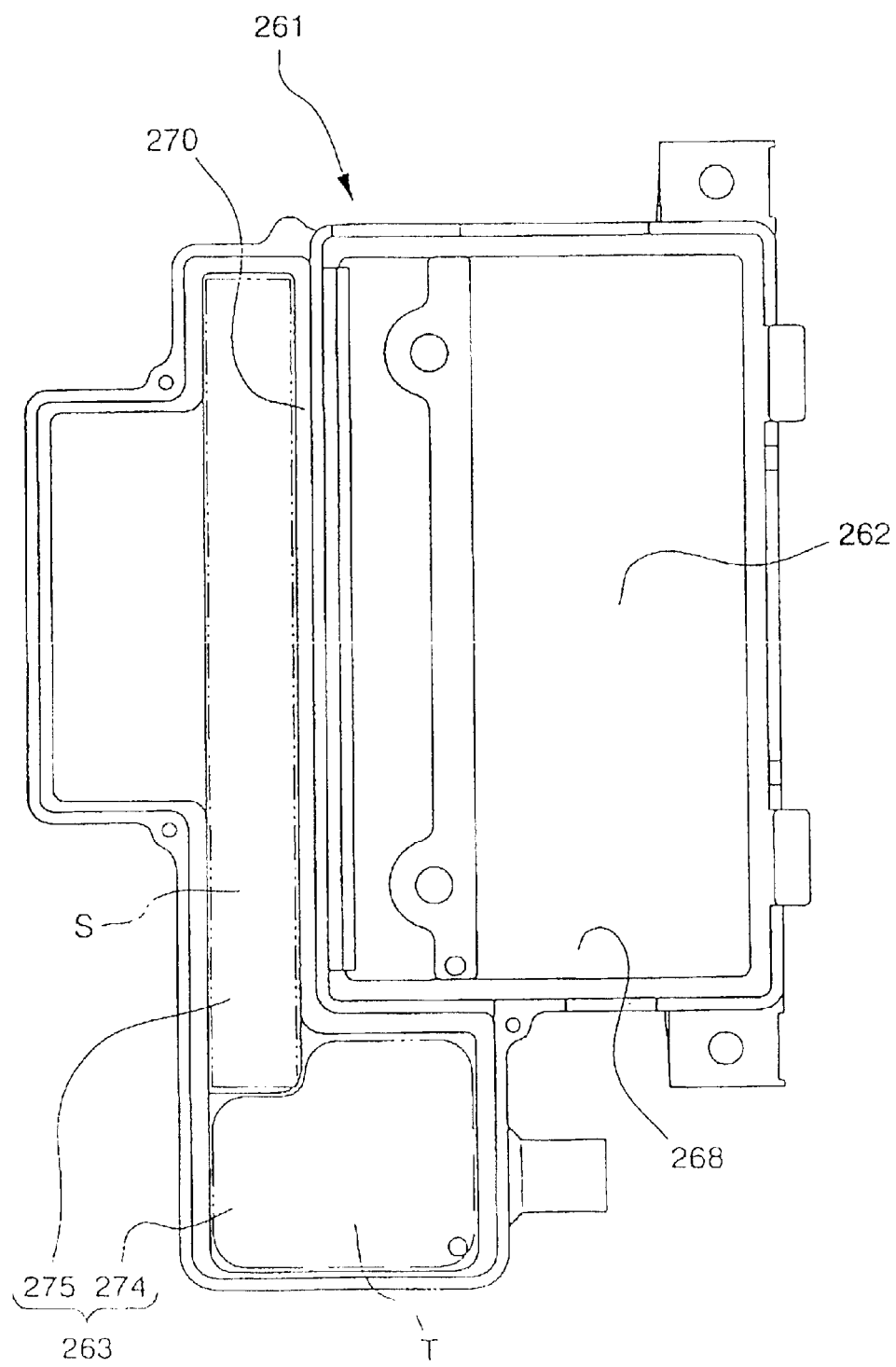
FIG. 22 is a plan view of the battery case of the motorcycle according to one embodiment of the present invention.
Figure 23:
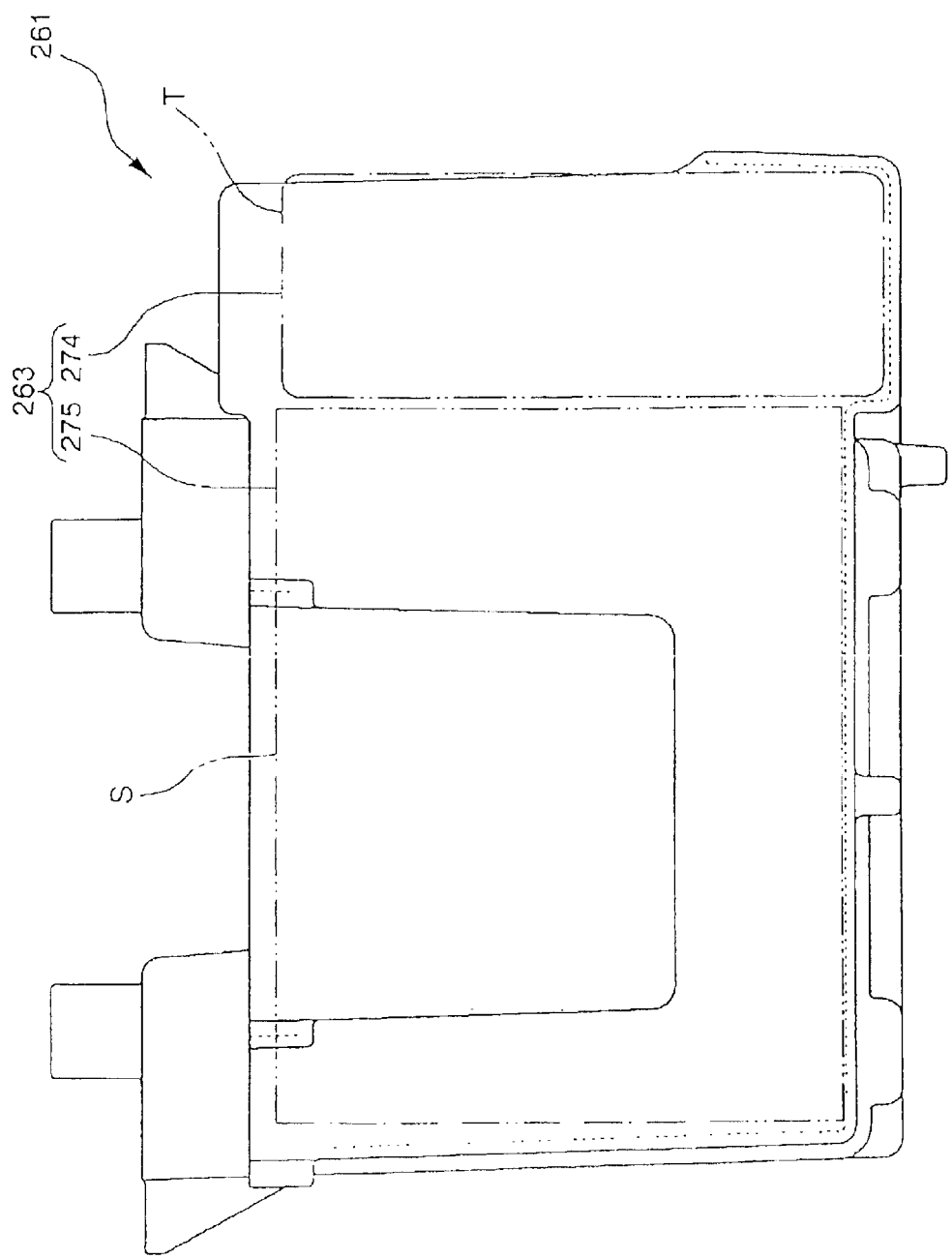
FIG. 23 is a side view of the battery case of the motorcycle according to one embodiment of the present invention.

The case body 264 comprises a first box-shaped portion 268 for defining the battery storage section 262 and a second box-shaped portion 269 for defining the document/tool storage section 263 formed on the left side in FIG. 21, FIG. 22 of the box-shaped portion 268. A partition 270 is provided between the first box-shaped portion 268 and the second box-shaped portion 269 for parting them. The case body 264 is secured on the vehicle body frame 2 side by a support stay 271 attached on the outside thereof (See FIG. 13).

As shown in FIG. 21 and FIGS. 24(a) to 24(c), the second box-shaped member 269 for defining the document/tool storage section is provided with an opening 273 for storing or taking out documents S or tools T thereof. The document/tool storing section 263 is divided into the near side and the far side with respect to the opening 273. The near side of the storage section with respect to the opening is used as the tool storage section 274 and the far side with respect to the opening is used as the documents storage section 275.

The second lid 267 is formed with an opening/closing lid 277 formed integrally therewith for covering the opening 273 formed on the lower sidewall of the tool storage section 274 in FIG. 24(a). The opening/closing lid 277 has a thinner portion 278 at the position facing towards the outer wall corner of the tool storage section 263 when assembled into the case body 264, so that it can be bent outwardly from the thinner portion 278. The opening/closing lid 277 is provided with a locking portion 280 that is engaged by the engaging portion 279 on the case body 264, so that the opening 273 can be kept closed via the locking portion 280. FIGS. 24(a) to 24(c) show a procedure to open the opening 273 and store documents S or tools T in the document/tool storage section 263.

The position of the opening 273 for storing or taking out the documents or the like is determined so that it is exposed towards the outside from the opened portion between the center pipe 27 and the rear pipe 28 when the battery case 261 is assembled to the vehicle body frame 2.

Figure 25:
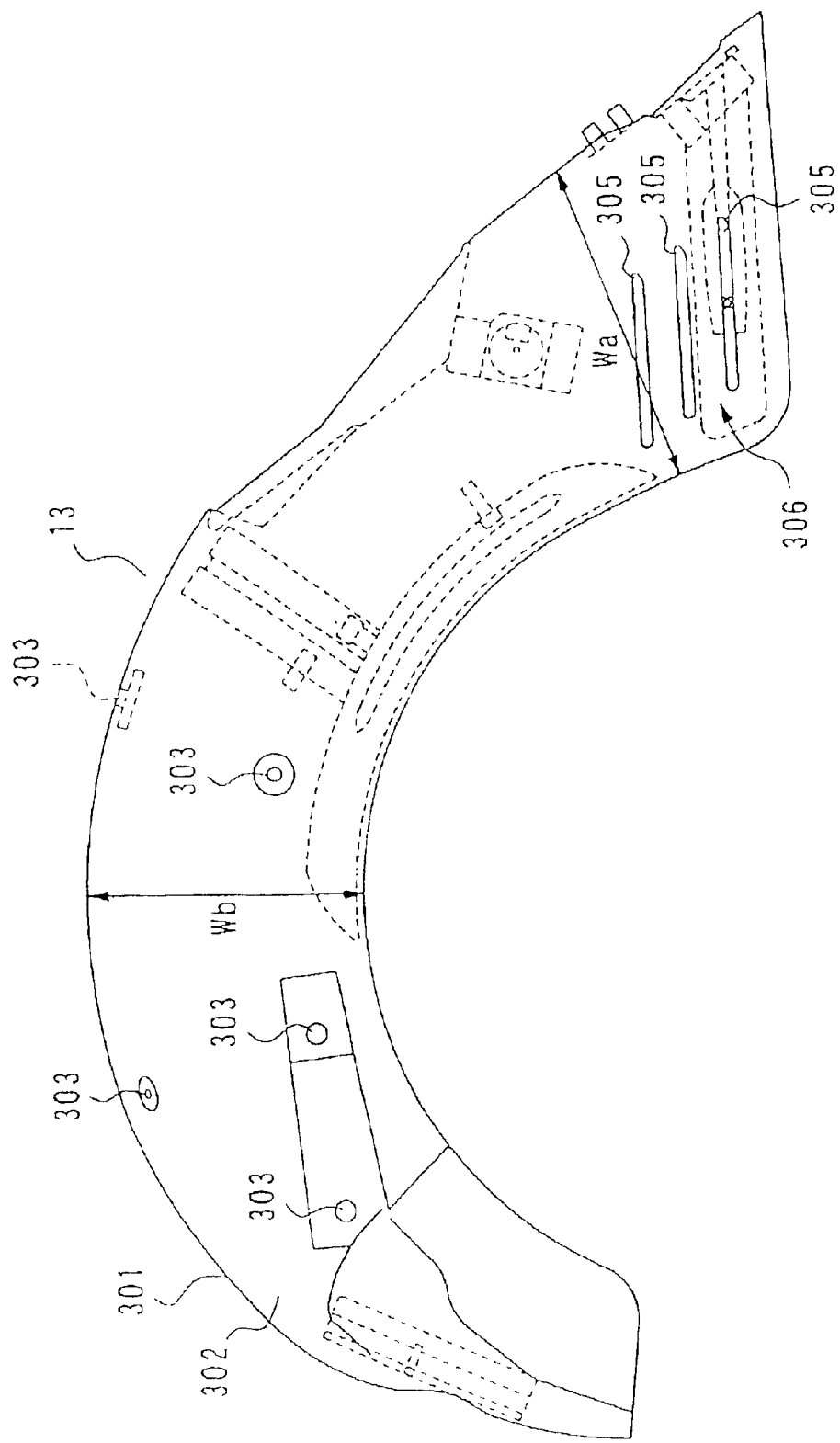
FIG. 25 is a side view of the rear fender of the motorcycle according to one embodiment of the present invention.

The rear fender 13 will now be described. The rear fender 13 is, as shown in FIG. 25, formed of thin plate member such as an iron plate by press molding into a U-shape in cross section. The rear fender 13 includes an arcuate surface portion 301 disposed so as to be laid along the outer peripheral surface of the rear wheel 12 at a suitable distance therefrom with left and right side surfaces 302 formed into a substantially fan shape extending respectively from the left and right edge of the arcuate surface portion 301 towards the centerline of the rear wheel.

The rear fender 13 is formed with engaging holes 303 as attached portions at required locations on the arcuate surface portion 301 and the left and right side surfaces 302, so that the rear fender 13 can be attached to the vehicle body frame 2 for example by passing a bolt through the engaging hole 303 and tightening it with a nut. The engaging hole 303 is formed substantially at the longitudinally center of the rear fender 13.

A wider portion 304 is formed at the rear end portion on the side surface 302 of the rear fender 13 being away from the position at which the engaging hole 303 is formed as the attaching portion. The wider portion 304 has a width Wa, which is wider than the width Wb of the remaining portion of the side surface 302. The wider portion 304 is formed with three rows of recesses 305 at suitable intervals so as to extend longitudinally of the vehicle body. The reinforced portion 306 including the recesses 305 are formed at the inner position, which is the opened edge side, of the side surface 302 of the rear fender with respect to the lateral center thereof.

The recesses 305 are formed integrally when the rear fender 13 is pressed.

Figure 26:
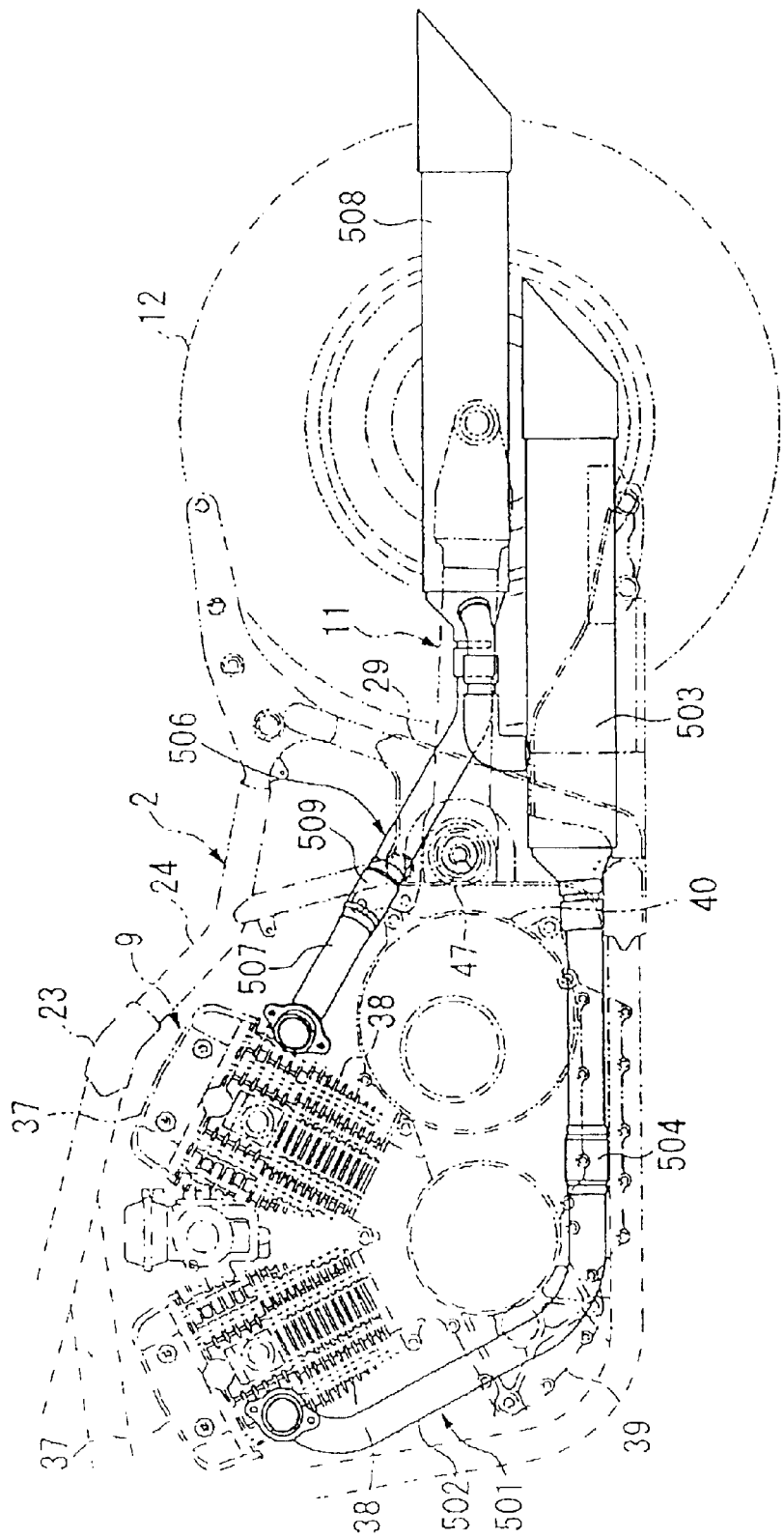
FIG. 26 is a side view of the muffler arrangement structure of the motorcycle according to one embodiment of the present invention.
Figure 27:
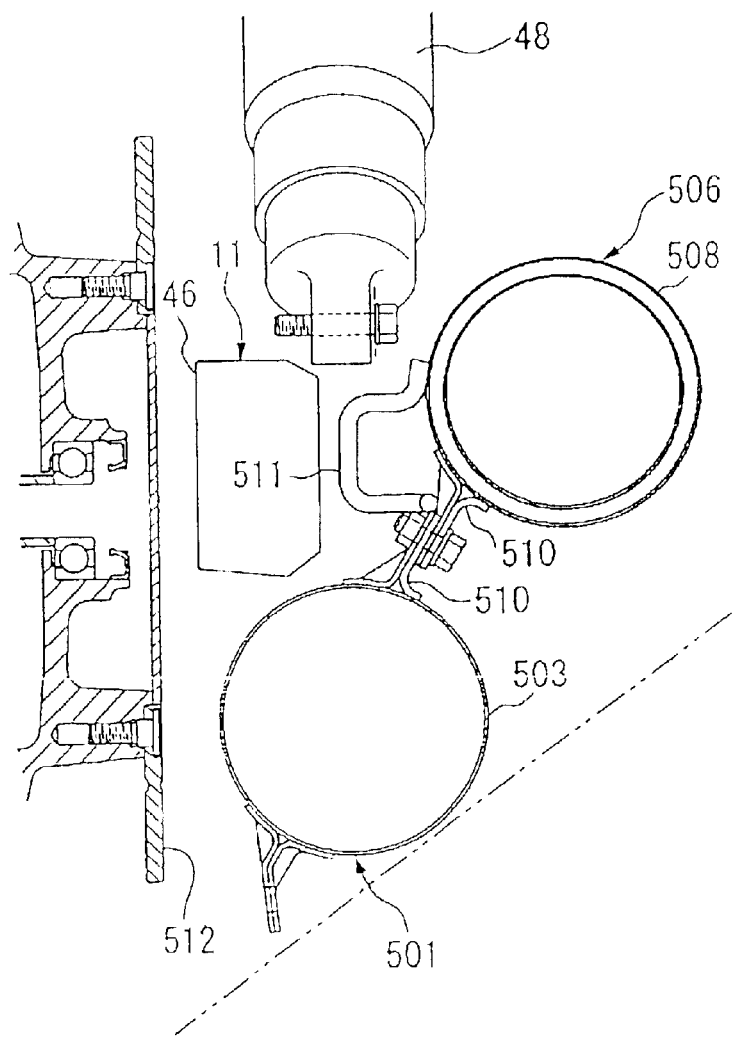
FIG. 27 is a back view of the muffler arrangement structure of the motorcycle according to one embodiment of the present invention.

The cylinder head sections 37 of the aforementioned respective cylinder blocks 38 are connected to the mufflers respectively for reducing exhaust sound generated by the engine 9, as shown in FIG. 26 and FIG. 27. The muffler 501 to be connected to the cylinder head section 37 of the front cylinder block 38 includes an exhaust pipe unit 502 to be connected to the cylinder head section 37 and a silencer unit 503 having a larger diameter than the exhaust pipe unit 502 for reducing sound. The muffler 501 extends downwardly from the end of the connection between the exhaust pipe unit 502 and the cylinder block 38, is then bent at the position downwardly of the engine 9, and then extends horizontally towards the rear along the lower portion of the crankcase 39 and the transmission 40. The muffler 501 is connected to the silencer unit 503 at the position rearwardly of the transmission 40. The silencer unit 503 is disposed on the right side of the vehicle body. The muffler 501 is formed separately from the exhaust pipe unit 502, and is provided with three-dimensional catalyst, not shown, in a catalyst supporting portion 504 that is to be assembled at the midsection of the exhaust pipe unit 502, so that the time period that is required until it is activated is reduced and thus catalytic performance at the startup timing is improved.

The muffler 506 to be connected to the cylinder head section 37 of the rear cylinder block 38 also comprises an exhaust pipe unit 507 to be connected to the cylinder head section 37 and a silencer unit 508 having a larger diameter relative to the exhaust pipe unit 507 for reducing sound. The muffler 506 extends rearwardly from the end of connection between the exhaust pipe unit 507 and the cylinder block 38 further extends rearwardly and obliquely downwardly along the upper side of the transmission 40 and then horizontally towards the rear, and is connected to the silencer unit 508. The silencer unit 508 is disposed on the right side of the vehicle body, which is the same side as the aforementioned silencer unit 503. The muffler 506 is also formed separately from the exhaust pipe unit 507 and is provided with a three-dimensional catalyst, not shown, in a catalyst supporting portion 509 that is to be assembled to the midsection of the exhaust pipe unit 507, so that the time period that is required until it is activated is reduced and thus catalytic performance at the startup timing is improved.

Both of the muffler 501 and the muffler 506 have the silencer unit 503 and the silencer unit 508 respectively at a distance in the horizontal direction one over another. The rear end of the lower silencer unit 503 extends horizontally to the position in the vicinity of the axis of the rear wheel 12, and the upper silencer unit 508 extends horizontally to the position further rearwardly with respect to the silencer unit 503.

The silencer unit 503 of the lower muffler 501 is, as shown in FIG. 27, disposed directly below the right fork portion 46 of the rear swing arm unit 11. In other words, the silencer unit 503 is shifted downwardly of the right fork portion 46 of the rear swing arm unit 11 in the vertical direction, and a part of it coincides with the right fork portion 46 of the rear swing arm unit 11 in the lateral direction.

The silencer unit 508 of the upper muffler 506 is disposed outside with respect to the lower silencer unit 503 in the lateral direction of the vehicle body, and is arranged on the right outside of the fork portion 46 of the rear swing arm unit 11. In other words, the silencer unit 508 coincides partially with the right fork portion 46 of the rear swing arm unit 11 in the vertical direction, and is shifted towards the outside with respect to the right fork portion 46 of the rear swing arm unit 11 in the lateral direction.

The lower silencer unit 503 and the upper silencer unit 508 are fixedly connected with each other by securing the linking members 510 which are fixed to them respectively by fastening with a bolt.

The upper silencer unit 508 is provided with a stopper member 511 fixed on the side of the rear swing arm unit 11 thereof. When the upper and lower mufflers 501, 506 are deformed in the lateral direction towards the vehicle body when being toppled, the stopper member 511 abuts against the rear swing arm unit 11 to prevent the upper muffler 506 from being deformed further in the lateral direction towards the vehicle body, and thus to prevent the lower muffler 501 connected to the upper muffler 506 from being deformed further in the lateral direction towards the vehicle body, thereby preventing the silencer unit 503 of the lower muffler 501 from being brought into contact with a disk 512 of a disk brake of the rear wheel 12.

Figure 28:
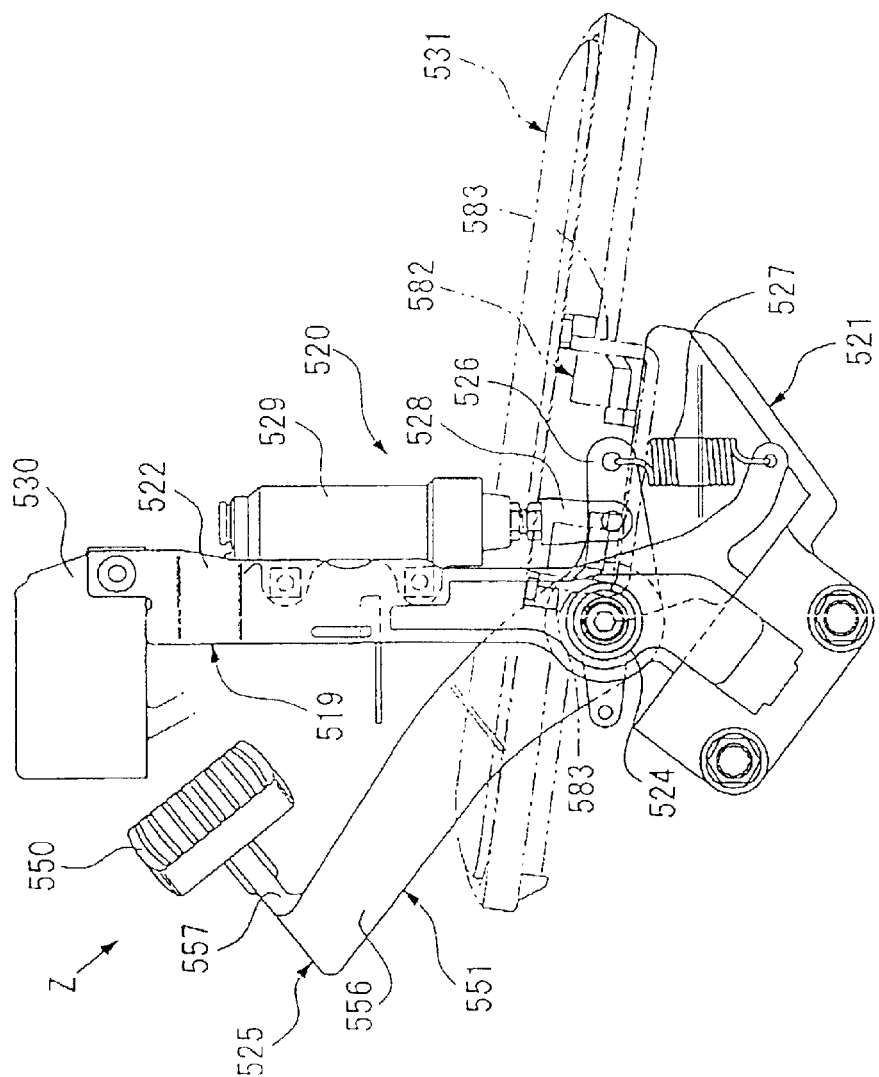
FIG. 28 is a side view of a brake input device of the motorcycle according to one embodiment of the present invention.
Figure 29:
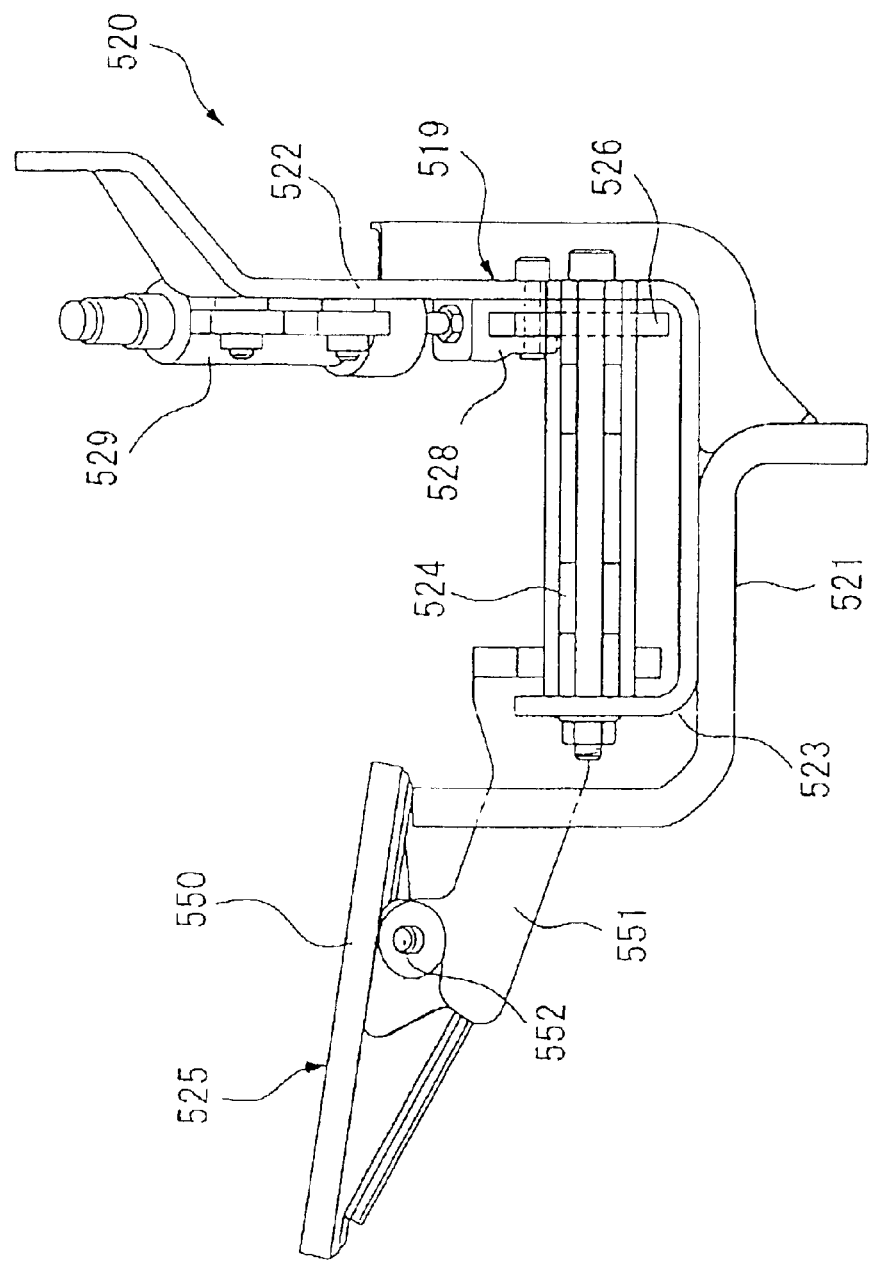
FIG. 29 is a drawing showing the brake input device of the motorcycle according to one embodiment of the present invention when viewed in the direction of the arrow X in FIG. 28.
Figure 30:
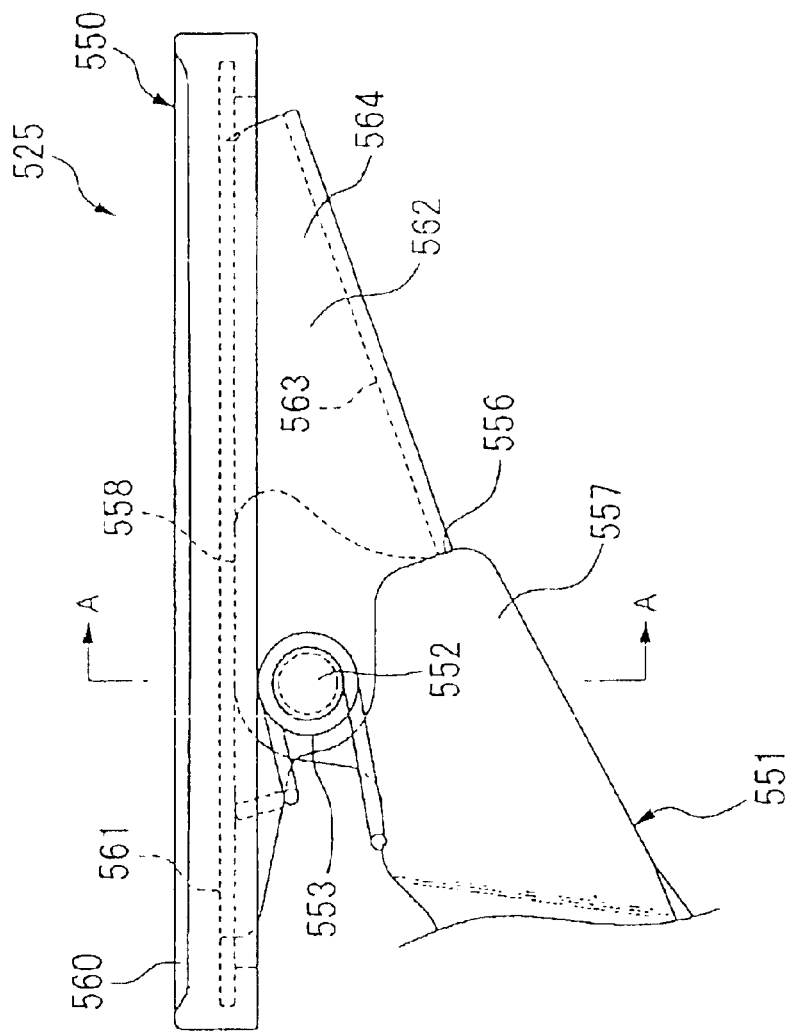
FIG. 30 is a front view of the brake pedal of the motorcycle according to one embodiment of the present invention.
Figure 31:
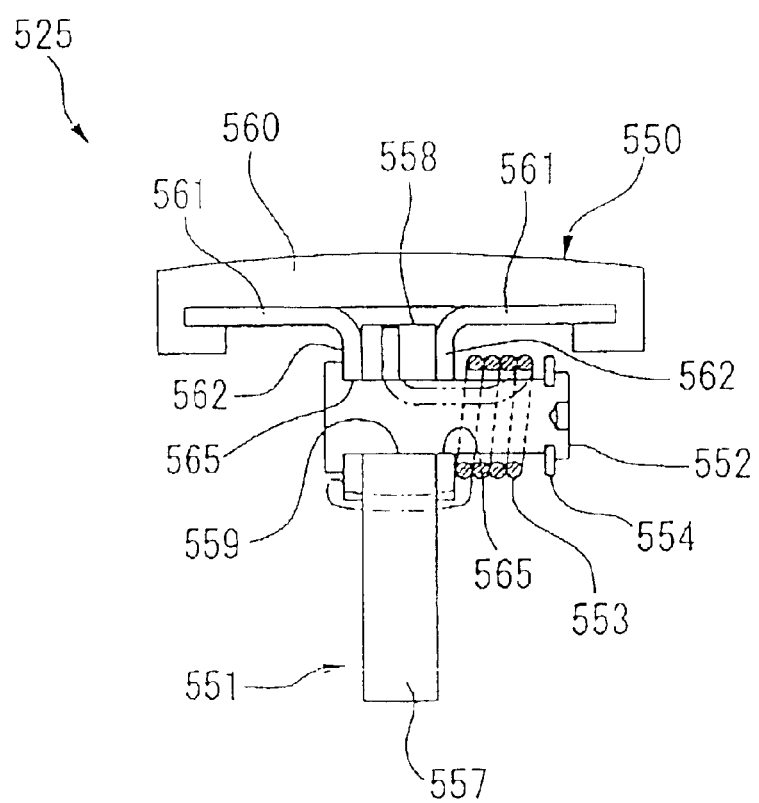
FIG. 31 is a cross-sectional view of the brake pedal of the motorcycle according to one embodiment of the present invention taken along the line A—A in FIG. 30.
Figure 32:
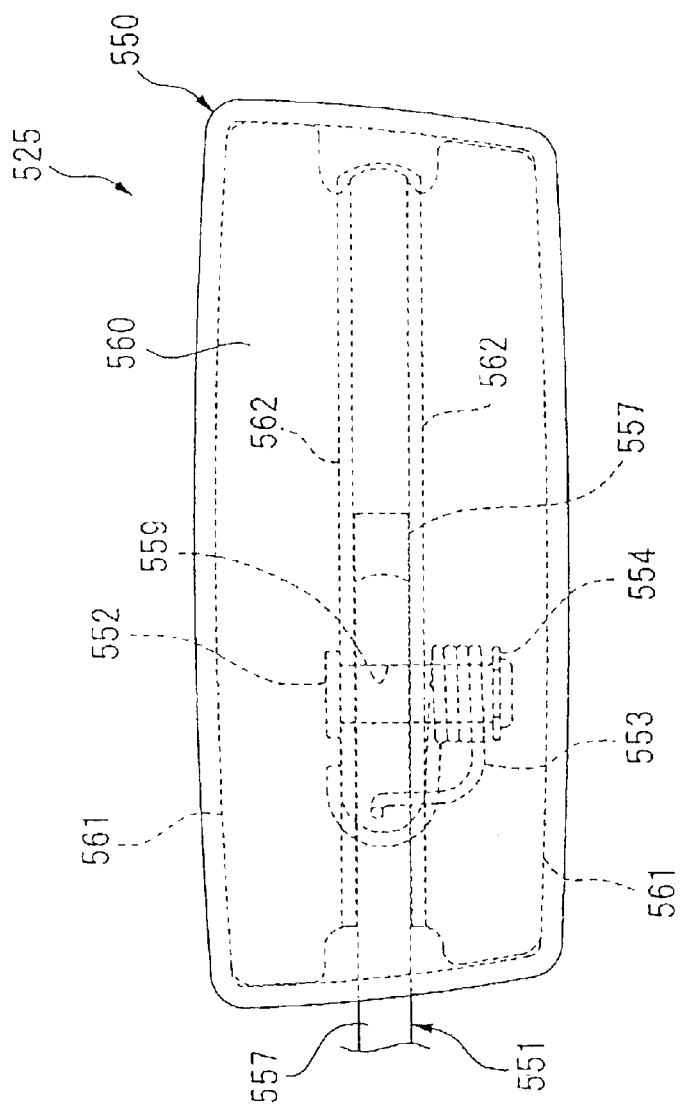
FIG. 32 is a plan view of the brake pedal of the motorcycle according to one embodiment of the present invention.

The right down pipe 33 of the aforementioned vehicle body frame 2 is provided with a brake input device 520 shown in FIG. 28 and FIG. 29 at the lower front end thereof.

The brake input device 520 includes a step bracket 521 to be fixed to the down pipe 33 with a bolt, and an integral stay 519 to be fixed to the step bracket 521 by welding. The integral stay 519 includes a master cylinder stay portion 522 extending upwardly, and a brake pivot holder portion 523.

The brake input device 520 comprises a brake pivot shaft (supporting shaft) 524 that is rotatably supported by the brake pivot holder portion 523 at both ends in a state of being laid along the same in the lateral direction. A brake pedal 525 is fixed to one end of the brake pivot shaft 524 on the right side of the vehicle body with a brake arm (operating member) 526 pivotally connected to the other end of the brake pivot shaft 524 on the side of the vehicle body. With such an arrangement, the brake pedal 525 is disposed outside the vehicle body on the right side at the position relatively far from the vehicle body.

In this case, the brake pedal 525 comprises a pedal pad unit 550 to which a foot force from the driver is introduced, a pedal lever unit 551 rotatably supported by the vehicle body side at the proximal end thereof and extending obliquely towards the upper front from the proximal end for pivotally supporting the pedal pad unit 550 at the distal end thereof, and a pin 552 for supporting the pedal pad unit 550 on the pedal lever unit 551.

The brake input device 520 comprises a return spring 527 to be interposed between the brake arm 526 and the integral stay 519, a master cylinder (operating portion) 529 to be mounted at the back side of the master cylinder stay portion 522 and connected to the brake arm 526 at the input portion 528 thereof, and a reservoir tank 530 attached to the upper end of the master cylinder stay portion 522 for feeding and discharging brake fluid with respect to the master cylinder 529. The master cylinder 529 in this case is disposed inside the outer end of the down pipe 33 of the vehicle body frame 2 in the lateral direction (inside the vehicle body), though it is not shown in the figure.

On the other hand, the step bracket 521 supports the step plate (step member) 531 for placing the driver's foot in a state of being disposed in the vicinity of the brake pedal 525. The step bracket 521 is also provided on the left side of the vehicle body where the brake input device 520 is not provided for supporting the step plate 531 for placing the driver's foot by the step bracket 521.

In the brake input device 520 described above, when the driver presses the brake pedal 525, the brake pedal 525 is rotated integrally with the brake pivot shaft 524 connected to one end thereof, and thus the brake arm 526 connected to the other end of the brake pivot shaft 524 away from the brake pedal 525 is rotated integrally. As a result, the brake arm 526 presses the input portion 528 of the master cylinder 529 upwardly and allows the master cylinder 529 to generate a braking fluid pressure.

The brake pedal 525 described above comprises, as shown in FIG. 28 to FIG. 32, a pedal pad unit 550 to which a foot force from the driver is introduced. A pedal lever unit 551 is rotatably supported by the vehicle body side at the proximal end thereof and extends obliquely towards the upper front from the proximal end for pivotally supporting the pedal pad unit 550 at the distal end thereof. A pin 552 is provided for supporting the pedal pad unit 550 on the pedal lever unit 551 with a spring 553 for allowing the pin 552 to be inserted inwardly and urging the pedal pad unit 550 to one side of a pivotal movement. A washer 554 is provided for preventing the pin 552 from coming off.

The pedal lever unit 551 comprises an extending portion 556 that is rotatably supported by the vehicle body side as a result that the proximal end thereof is fixed to the end of the laterally oriented brake pivot shaft 524, which is the outer side with respect to the vehicle body. The extending portion 556 has a plate shape and is connected to the brake pivot shaft 524 at the proximal end thereof with the direction of thickness oriented in the lateral direction in a state of extending obliquely from the proximal end towards the upper front.

The pedal lever unit 551 comprises a supporting member 557 provided at the distal end on the extended side of the extending portion 556 in the direction intersecting the extending portion 556 for pivotally supporting the pedal pad unit 550. The supporting member 557 has a plate shape and extends from the distal end of the extending portion 556 rightwardly and then projects upwardly from the distal end thereof with the direction of thickness oriented in the longitudinal direction of the extending portion 556. The extending portion 556 and the supporting member 557 are formed integrally, and more specifically, they are formed by bending a plate shaped member.

The supporting member 557 is formed with a hole 559 extending through the thickness thereof at the projected portion 558 projected upwardly from the distal end thereof.

The pedal pad unit 550 comprises a pair of flat depressing surface forming portions 561 to be covered by covers 560, for example, of rubber on the front faces on which the driver depresses, a pair of mounting portions 562 extending from the depressing surface forming portion 561 in the direction opposite from the cover 560 for being pivotally mounted at the supporting member 557 in the state of being disposed on both sides of the supporting member 557 of the pedal lever unit 551, and a connecting portion 563 for connecting a pair of mounting portions 562 with each other on the opposite side thereof from the depressing surface forming portion 561.

A pair of depressing surface forming portions 561 are rectangular in shape, and extend in the opposite directions on the same plane from the opposite edges of the respective mounting portions 562 from the connecting portion 563. The pair of depressing surface forming portions 561 are oriented so that the elongated sides are laid along the extending direction.

The pair of mounting portions 562 include inclined portions 564 such that the extending amount from the depressing surface forming portion 561 decreases along the length of the depressing surface forming portion 561 towards one end thereof, and the connecting portion 563 is formed only on the inclined portion 564. A hole 565 passes through both of the mounting portions 562 at the portion where the connecting portion 563 is not formed.

The pair of depressing surface forming portions 561 and the pair of mounting portions 562 and a connecting portion 563 are formed integrally, and more specifically, they are formed by bending a plate shaped member.

Then, the pedal pad unit 550 is supported by the pedal lever unit 551 by inserting the pin 552 into the hole 565 on the mounting portion 562 and the hole on the supporting member 557, providing a spring 553 so as to dispose the pin 552 inside, and engaging a washer 554 with the pin 552 in a state in which the pair of mounting portions 562 of the pedal pad unit 550 are disposed on both sides of the supporting member 557 of the pedal lever unit 551.

In this case, one of the margins of pivotal motion of the pedal pad unit 550 with respect to the pedal lever unit 551 is determined by abutment of the connecting portion 563 of the pedal pad unit 550 against the abutting portion 566 of the supporting member 557 of the pedal lever unit 551 opposite from the extending portion 556. In addition, the pedal pad unit 550 is urged into the direction to bring the connecting portion 563 into abutment against the abutting portion 566 by an urging force of the spring 553. In other words, the pedal pad unit 550 is in the normal state when it is in the marginal position of the pivotal motion, and in this normal state, the pedal pad unit 550 is laid along the lateral direction of the vehicle body. When a certain force is exerted on the pedal pad unit 550 from underneath thereof, the pedal pad unit 550 rotates in such a manner that the right end is moved upward.

Figure 33:
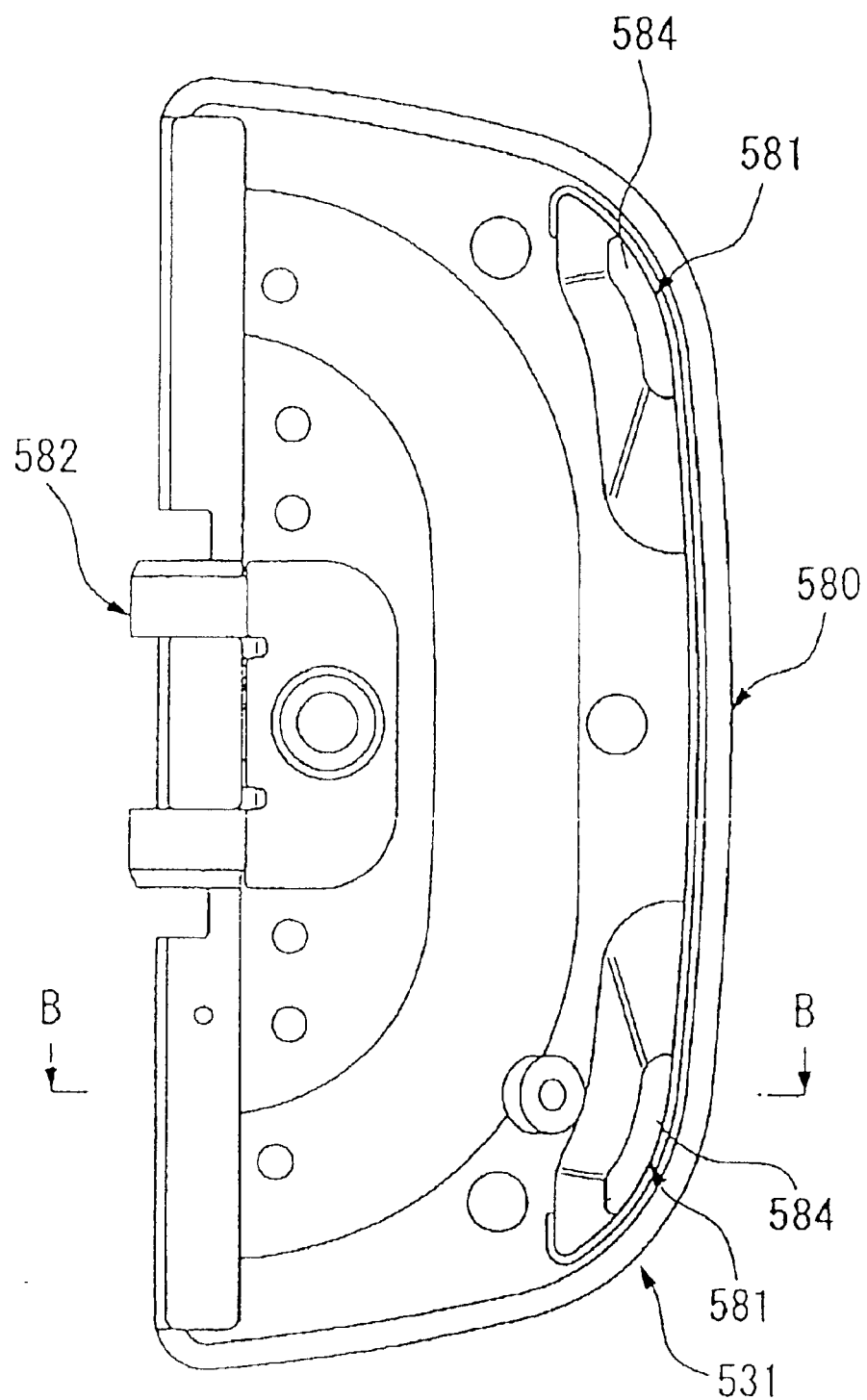
FIG. 33 is a bottom view of the step plate of the motorcycle according to one embodiment of the present invention.
Figure 34:
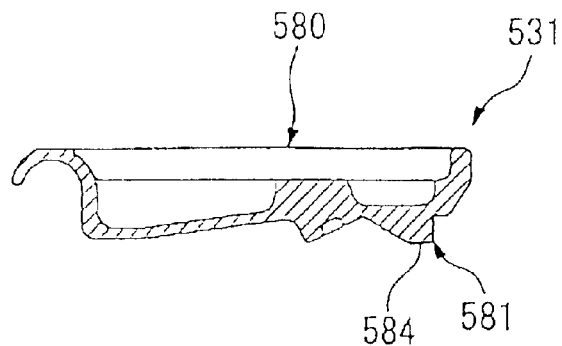
FIG. 34 is a cross sectional view of the step plate of the motorcycle according to one embodiment of the present invention taken along the line B—B in FIG. 33.

The aforementioned step plate (step member) 531 is for placing the driver's foot, and comprises, as shown in FIG. 33 and FIG. 34, a platform 580 on which the driver places his/her foot, and a back sensor 581 that projects downwardly from the platform 580 and comes into contact with the ground when the vehicle body is inclined.

The platform 580 is substantially a flat plate shape with curved corners at both ends of one of the edges in parallel with the length thereof and a mounting portion 582 on the other edge that is in parallel with the length thereof for being rotatably supported by the step bracket 521. In other words, as shown in FIG. 28, the step bracket 521 is formed with a pair of supporting portions 583 disposed forwardly and backwardly in a substantially vertical direction, so that the mounting portion 582 of the step plate 531 is rotatably mounted on supporting portions 583 thereof. The step plate 531 in the state of being mounted on the step bracket 521 is disposed in such a manner that the longitudinal side lies longitudinally of the vehicle body, and projects from the vehicle body towards a left and right outside thereof. From this state, it is capable of pivotal movement in the direction in which the projecting extremity is positioned upwardly.

The platform 580 is formed with bank sensors 581 on the lower side and the opposite side from the mounting portion 582 at the forward and backward positions thereof along the longitudinal direction of the vehicle body so as to project downwardly from the platform 580, respectively. The respective back sensors 581 are elongated in the direction longitudinally of the vehicle body, slightly curved along the corners of the platform 580, and are a mirror symmetry with respect to each other. The back sensor 581 has a substantially flat ground plane 584 on the lower face, which comes into contact with ground when the vehicle body is inclined.

In such a step plate 531, the platform 580 and the bank sensors 581 located at two positions are formed integrally with each other. In other words, the step plate 531 is a die cast article of aluminum alloy for example, and thus the platform 580 and the bank sensors 581 at the two locations are formed integrally at the time of die casting.

The constructions of the supporting portion 583 of the left and the right step brackets 521 in the vehicle body are the same. Thus, the left and the right step brackets 521 have the step plates 531 of the same configuration mounted thereon.

Figure 35:
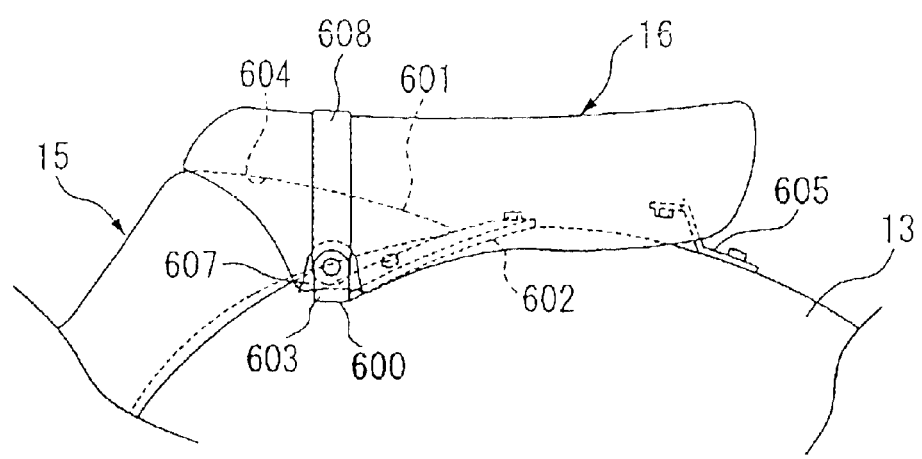
FIG. 35 is a side view of the seat mounting structure of the motorcycle according to one embodiment of the present invention.
Figure 36:
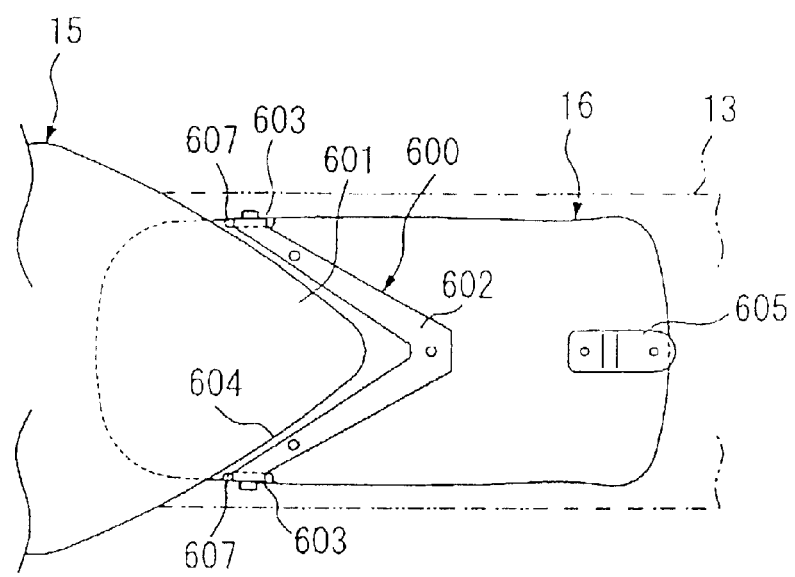
FIG. 36 is a bottom view of the seat mounting structure of the motorcycle according to one embodiment of the present invention.

As regards the pillion seat 16 to be disposed further backwardly of the main seat 15 being placed on the aforementioned rear fender 13 on the rear side thereof, the seat mounting structure in which the front portion of the pillion seat 16 is mounted on the rear fender 13 includes, as shown in FIG. 35 and FIG. 36, a mounting stay 600 that is mounted on the rear fender 13 so that the mounting stay 600 supports the left and right sides of the pillion seat 16.

The main seat 15 has a configuration including a pointed projection 601 in a V-shape in plan view and in side view at the rear thereof (so-called gun fighter type), and the front portion is placed on the vehicle body frame 2 and the rear portion is placed on the rear fender 13. In this state, the main seat 15 is bolted to the vehicle body frame 2 in the vicinity of the fuel tank 14 on the front side and bolted to the stay or the like that is attached on the vehicle body frame 2 on the rear side, though it is not shown in the figure.

The mounting stay 600 for mounting the pillion seat 16 includes a midsection 602 of a V-shape in plan view so as to fit the configuration of the projection 601 of the main seat 15 in plan view, and includes also supporting portions 603 that curve in the same direction respectively from both ends of the midsection 602. The mounting stay 600 is bolted on the rear fender 13 at the midsection 602 thereof in a state in which the midsection 602 is fitted on the outer side of the projection 601 of the main seat 15, that is, in a state in which the supporting portion 603 is disposed forwardly of the midsection 602. In this case, both supporting portions 603 of the mounting stay 600 project upwardly in the vertical direction from the rear fender 13 with its thickness oriented in the lateral direction of the vehicle body, and simultaneously coincide with the projection 601 of the main seat 15 in the for-and-aft direction.

The pillion seat 16 is formed with a recess 604 on the front portion thereof so as to be capable of covering the pointed projection 601 of the main seat 15 fixed on the rear fender 13, and is provided with a rear mounting stay 605 on the lower surface of the rear portion thereof. The pillion seat 16 further comprises mounting portions 607 on the left and right sides of the front portion thereof. While the pillion seat 16 is attached on the left and right supporting portions 603 of the mounting stay 600 via the left and right of the mounting portion 607, respectively, with screws in the state of being placed on the rear fender 13 with the projection 601 of the main seat 15 fitted into the recess 604, the rear portion thereof is attached on the rear fender 13 by means of the rear mounting stay 605. When the left and right mounting portions 607 of the pillion seat 16 are attached to the left and right supporting portions 603 of the mounting stay 600, both ends of the seat belt 608 that is to be tighten around the surface of the pillion seat 16 are also fixed to the supporting portions 603 together. In other words, the mounting stay 600 also supports the seat belt 608. Though the front portion of the pillion seat 16 formed with a recess 604 is thinner due to the formation of recess 604. Since the pillion seat 16 is overlaid on the projection 601 of the main seat 15, the substantial thickness is the sum of these thicknesses.

Figure 37:
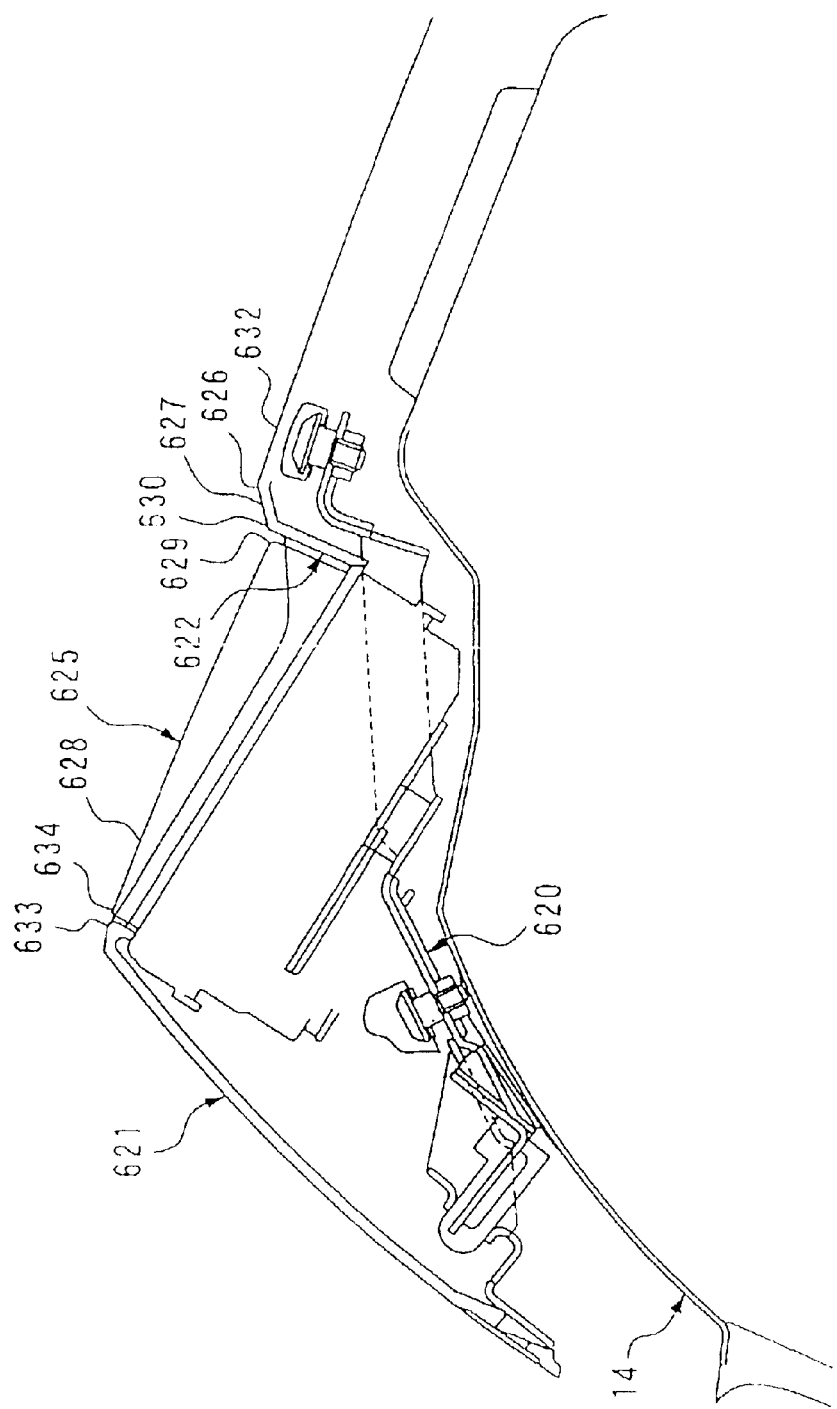
FIG. 37 is a side cross sectional view of the meter cover of the motorcycle according to one embodiment of the present invention.
Figure 38:
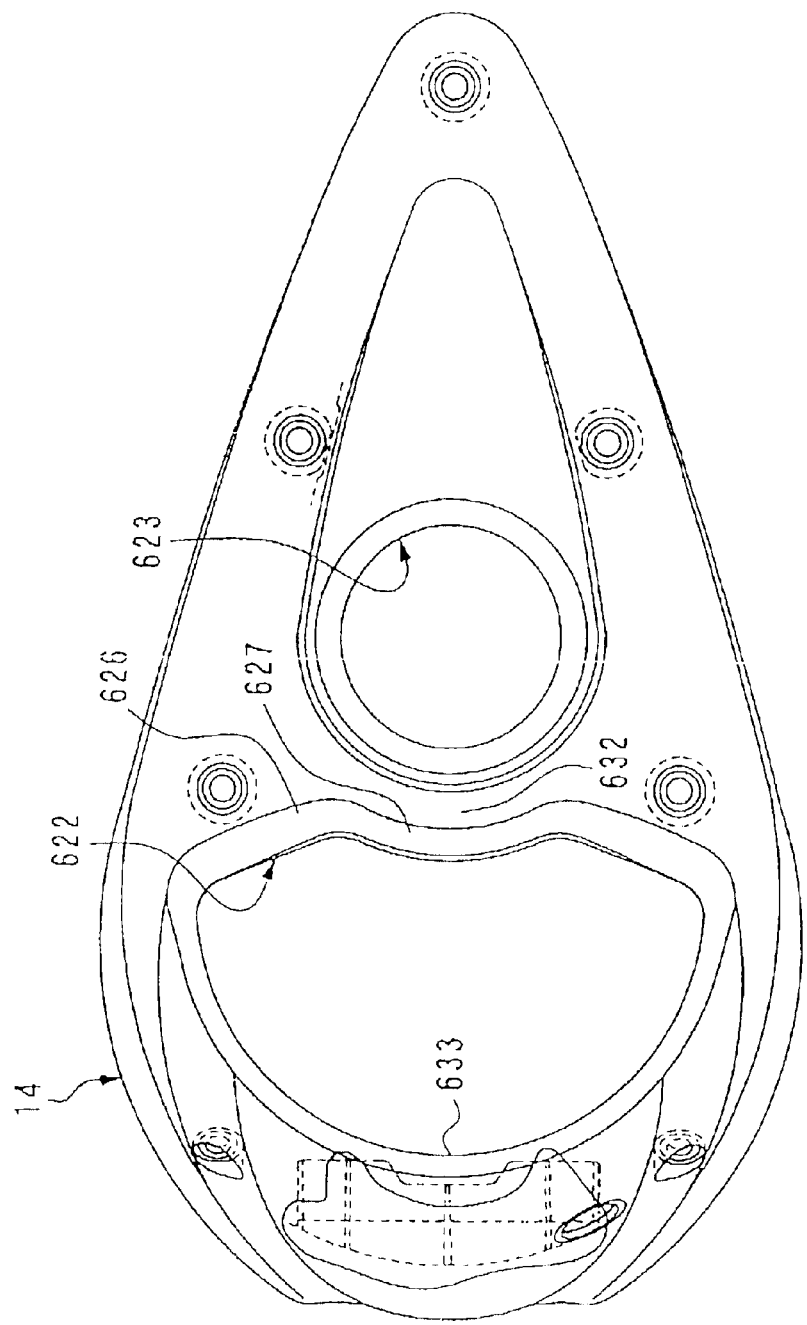
FIG. 38 is a plan view of the meter cover of the motorcycle according to one embodiment of the present invention.

The aforementioned fuel tank 14 is, as shown in FIG. 37, attached with a supporting member 620 on the upper side, and a meter cover 621 formed with a plated layer on the surface thereof is attached via the supporting member 620 or the like. The meter cover 621 is, as shown in FIG. 38, provided with openings 622, 623 aligned in the longitudinal direction. The rear opening 623 is circular and the front opening 622 is fan shape but a small fan shape is removed from the center side. The openings 622, 623 are for accommodating meters (in FIG. 37, only a meter 625 that is to be disposed in the front opening 622 is shown).

The front opening 622 of the meter cover 621 is formed along a rear edge 626 with a chamfered portion 627 being linear in cross section (taken along the vertical plane along the longitudinal direction) that is inclined downward towards the front. In addition, the height of the rear edge portion 629 of the upper surface 628 of the meter 625 to be disposed in this opening 622 is determined not to be higher than the lower end 630 of the chamfered portion 627.

The front edge 633 of the opening 622 is disposed on the forward extension of the upper surface 632 continuing into the rear portion of the chamfered portion 627 of the meter cover 621. Further, the front side of the edge 634 of the upper surface 628 of the meter 625 is substantially flush with the front edge 633 of the opening 622.

As a result of such an arrangement, the angle of the upper surface 628 of the meter 625 with respect to the chamfered portion 627 of the meter cover 621 is different from that with respect to the upper surface 632 continuing into the rear portion of the chamfered portion 627. More specifically, the upper surface 632 continuing into the rear portion of the chamfered portion 627 is inclined at a prescribed angle so that the front side comes higher. The chamfered portion 627 is inclined at a prescribed angle so that the front side comes lower, and the upper surface 628 of the meter 625 is inclined at a prescribed angle larger than the upper surface 632 continuing into the rear portion of the chamfered portion 627 so that the front side comes higher.

Figure 39:
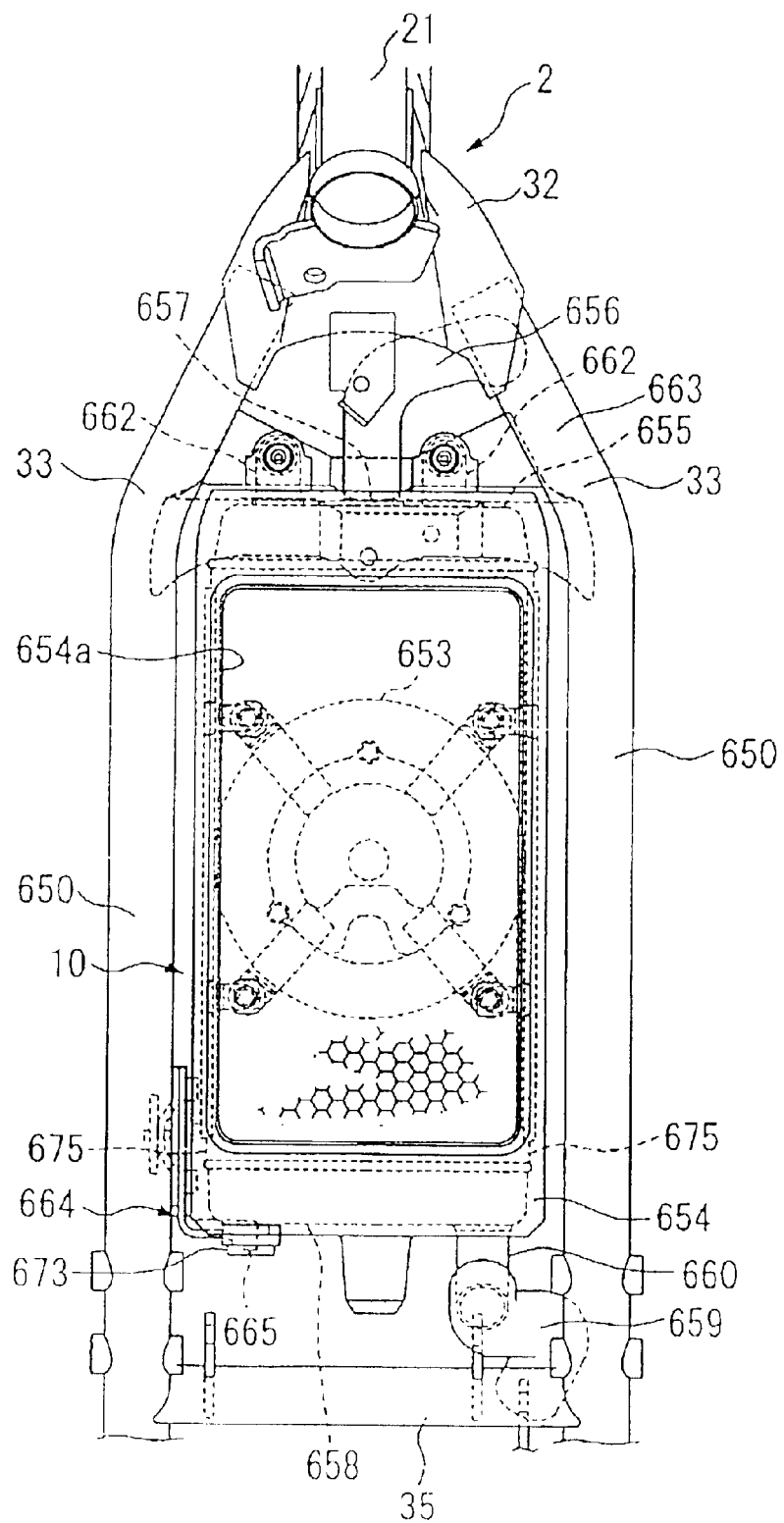
FIG. 39 is a front view of the radiator supporting structure of the motorcycle according to one embodiment of the present invention.
Figure 40:
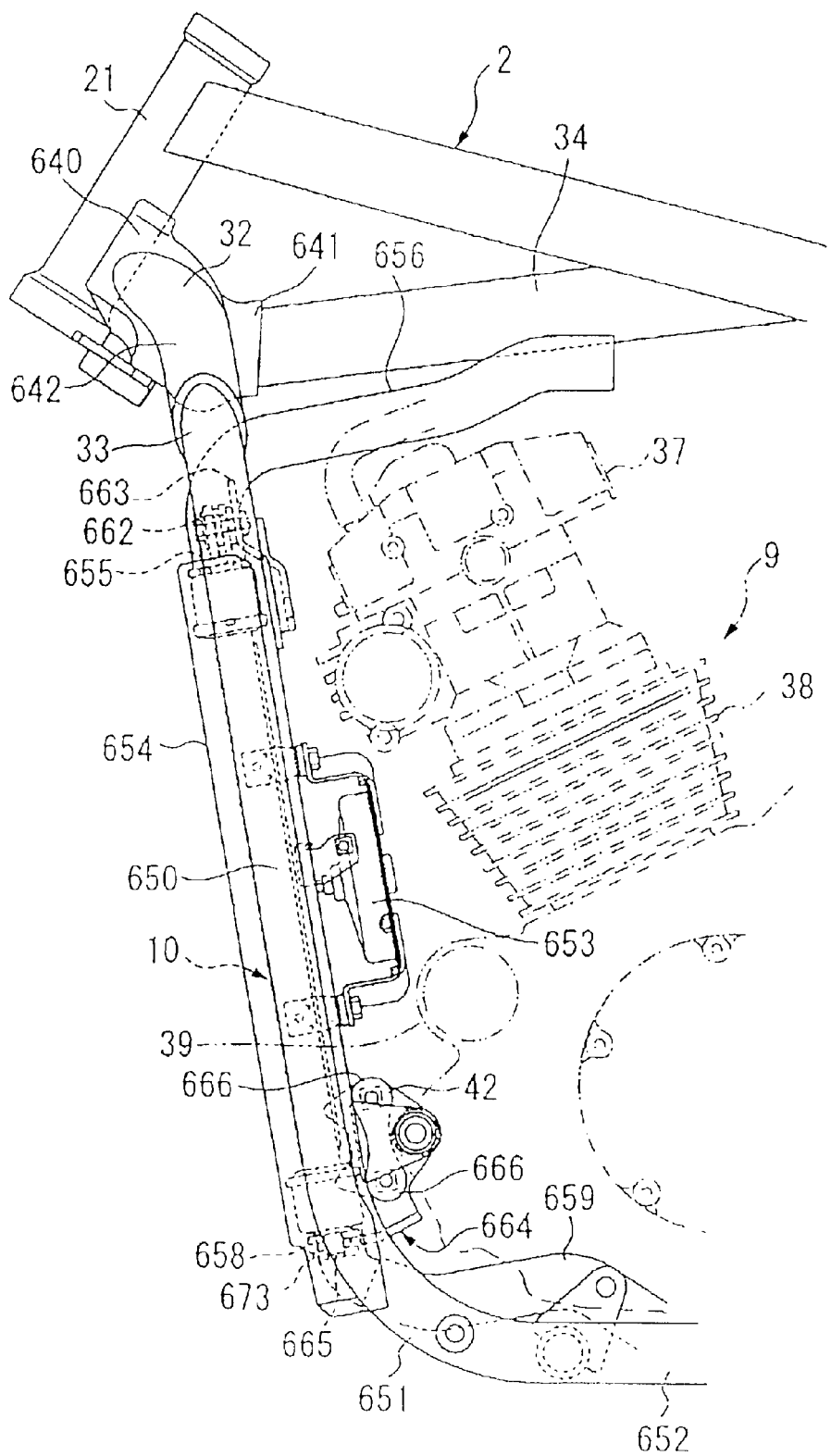
FIG. 40 is a side view of the radiator supporting structure of the motorcycle according to one embodiment of the present invention.
Figure 41:
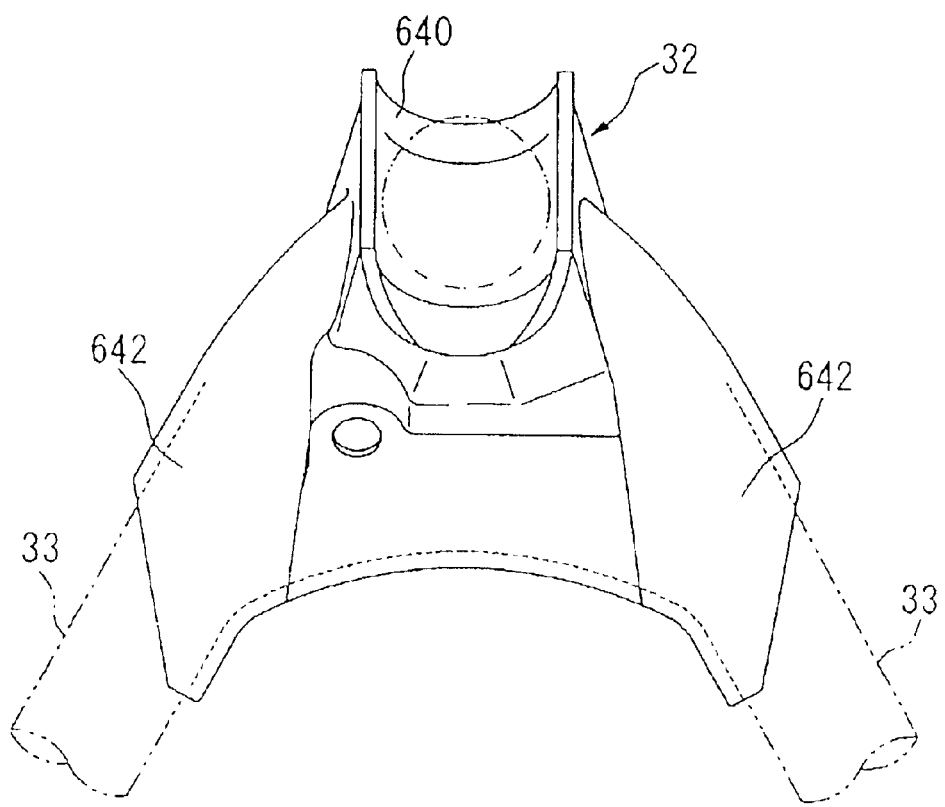
FIG. 41 is a drawing of a gusset of the motorcycle according to one embodiment of the present invention.

The gusset 32 to be welded to the head pipe 21 of the vehicle body frame 2 supporting the front fork 3 is, as shown in FIG. 39–FIG. 41, provided on one side with a mounting portion 640 in such a shape that a cylinder is cut along the line parallel with the axis thereof. A rear fitting portion 641 in a square cylindrical shape extends in the opposite direction from the mounting portion 640 with a pair of cylindrical lower fitting portions 642 extending from between the mounting portion 640 and the fitting portion 641 so as to be a mirror symmetrical with respect to each other. The gusset 32 is an integrally molded article formed of a white malleable cast iron that can be configured relatively freely by the use of a core cylinder, and that can be provided with a sufficient welding strength by decarburization.

The gusset 32 is secured to the head pipe 21 by joining with the head pipe 21 at its mounting portion 640 and is welded along the whole periphery of the mounting portion 640. The gusset 32 is also secured to the sub-pipe 34 by fitting the square cylindrical sub-pipe 34 on the inner side of the square cylindrical rear fitting portion 641 and by welding the same along the whole periphery thereof. Further, both down pipes 33 are fixed by fitting the cylindrical down pipes 33, respectively, into the cylindrical lower fitting portions 642 of the gusset 32 and welding along the entire periphery thereof. The sub-pipe 34 and the down pipe 33 can be welded without alignment by forming the gusset 32 of white malleable cast iron and by inserting the sub-pipe 34 and the down pipe 33 therein and joining them by welding as described above. In addition, while the gusset 32 is interposed between the fuel tank 14 and the front fork 3 and thus is disposed at the position which is highly visible in appearance, the sub-pipe 34 and the down pipe 33 are integrally configured and thus the appearance is also improved.

The pair of left and right down pipes 33 extend from the head pipe 21 of the vehicle body frame 2 supporting the front fork 3 and are bifurcated via the gusset 32 with each comprising a downward extension 650 extending downwardly from the head pipe 21, a bent portion 651 bent from the lower portion of the downward extension 650 rearwardly, and a rearward extension 652 extending rearwardly from the lower portion of the bent portion 651. The radiator 10 is supported between the pair of left and right downward extensions 650 in the stored state.

In other words, the radiator 10 is in a substantially rectangular shape and is supported by the downward extension 650 in such a manner that the elongated side is laid along the downward extension 650 of the down pipe 33, and the whole length coincides longitudinally with the downward extension 650.

A fan 653 is provided on the rear side of the radiator 10, or on the side of the engine 9, and a separate cover 654 having an opening 654a is attached on the front side of the radiator 10. An intake port 657 to which a cooling water pipe 656 for flowing cooling water is to be connected is provided at the lateral center of the upper surface 655 of the radiator 10 so as to project upwardly. A discharge port 660 to which a cooling water pipe 659 for flowing cooling water is connected, is provided at the lateral one side of the lower surface 658 of the radiator 10 so as to project downwardly. In this case, cooling water before cooling is introduced from the side of the engine 9 via the cooling water pipe 656 to the inlet port 657. From the discharge port 660 the cooling water after cooling is discharged via the cooling water pipe 659 towards the side of the engine 9.

The upper surface 655 on the upper part of the radiator 10 that faces upwardly is provided with a pair of left and right upper part supporting portions 662 so as to project upwardly. On the other hand, the upper side of the radiator 10 is provided with the upper part mounting member 663 that is to be supported by the downward extensions 650 so as to connect the left and right downward extensions 650 with each other. The pair of left and right upper part supporting portions 662 of the radiator 10 is secured together by a bolt to the upper part mounting member 663. Accordingly, the radiator 10 is secured to the downward extensions 650 at the upper part thereof.

The lower surface 658 of lower part of the radiator 10 that faces downwardly is formed with a lower part supporting portion 665 at one lateral side of the vehicle body, or more specifically, on the right side so as to project downwardly, and the lower part supporting portion 665 is supported by the engine hanger (supporting member) 664 for supporting the engine 9 on the bracket 42 of the down pipe 33.

Figure 42:
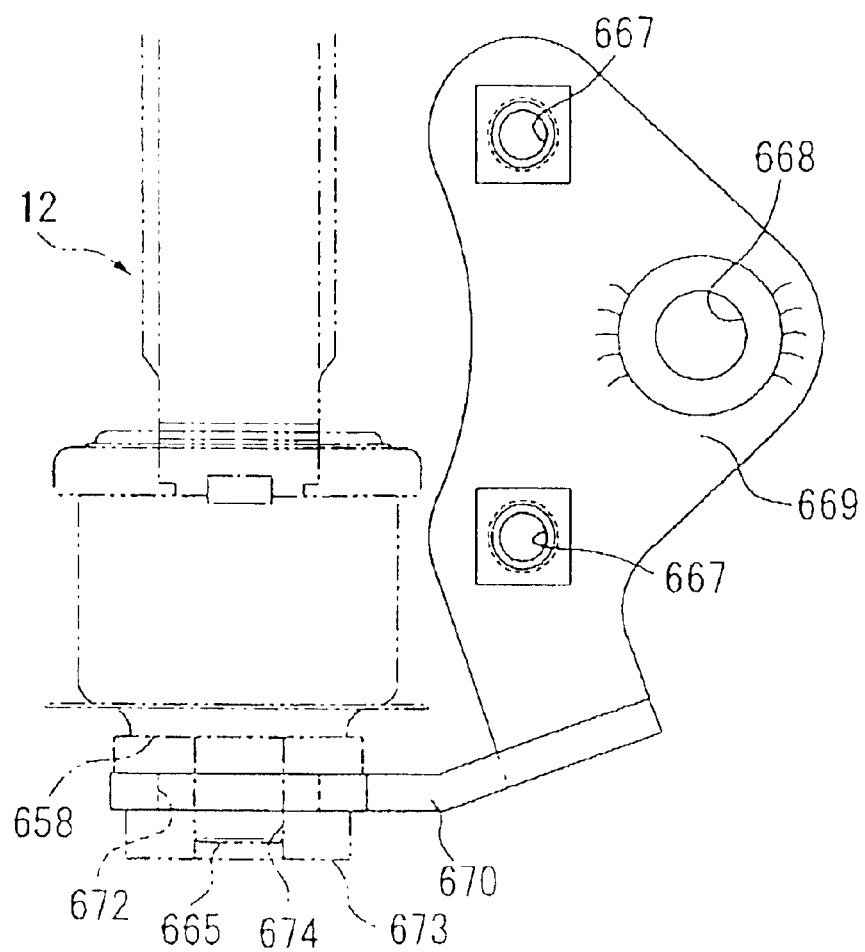
FIG. 42 is a side view of the engine hanger of the motorcycle according to one embodiment of the present invention.

In other words, the engine hanger 664 for supporting the engine 9 on the down pipe 33 is configured as shown in FIG. 42, and is provided with a mounting hole 667 to be bolted on the upper and lower fixing portions 666 of the bracket 42 fixed on the rear side of the downward extension 650 as shown in FIG. 40 by welding, a main plate portion 669 disposed rearwardly of the mounting hole 667 in the state of being fixed on the bracket 42 of the down pipe 33 via the mounting holes 667, and formed with a supporting hole 668 to be bolted to the front end portion of the crankcase 39 of the engine 9, and a supporting plate portion 670 extending from the main plate portion 669 forward for supporting the radiator 10.

The supporting plate portion 670 is formed with a supporting hole 672 on the front end side thereof. The supporting hole 672 is attached with a grommet 673, and the lower part supporting portion 665 of the radiator 10 is inserted into the fitting hole 674 inside of the grommet 673. Accordingly, the lower portion of the radiator 10 is supported by the downward extension 650.

As described above, in the supported state the radiator 10 is supported between the left and right downward extensions 650 with the elongated side being laid along the downward extension 650 and the whole length thereof coincides with the downward extension 650 in the fore-and-aft direction in a state in which both of the upper part supporting portions 662 are bolted on the upper part mounting member 663 supported on both of the downward extensions 650, and the lower part supporting portion 665 is inserted into the grommet 673 of the engine hanger 664 mounted on the down pipe 33 on the right side of the vehicle body. The radiator 10 itself is supported by the down pipe 33 only via the upper part supporting portion 662 and the lower part supporting portion 665.

Therefore, in the supported state as described above, no separate supporting member is provided between the left and right side surface 675 of the radiator 10 and both of the downward extensions 650 of the down pipe 33 for connecting them together. In other word, the main plate portion 669 of the engine hanger 664 is positioned rearwardly of the downward extension 650 as a whole in a state of being bolted on the fixing member 666 of the down pipe 33. Thus, the engine hanger 664 will never be positioned between the radiator 10 and the downward extension 650.

The aforementioned front winker (light emitting device) 5 and the rear winker (light emitting device) 117 may be constructed as follows.

Figure 43:
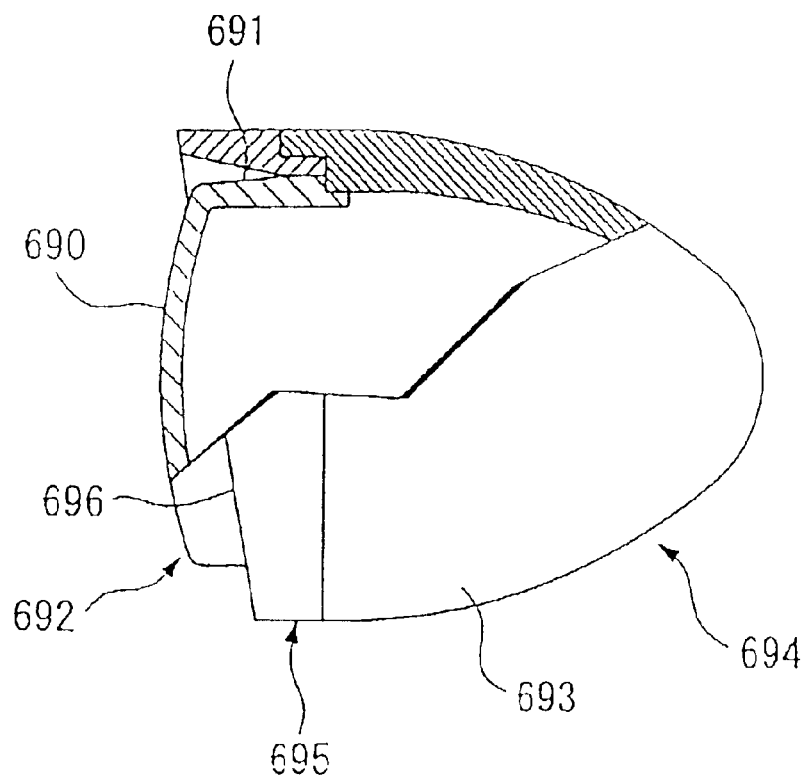
FIG. 43 is a side cross sectional view of a light emitting device of the motorcycle according to one embodiment of the present invention.
Figure 44:
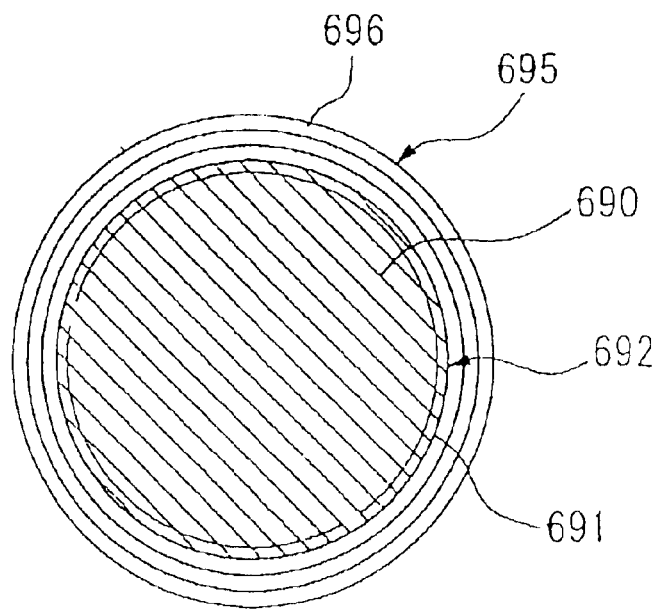
FIG. 44 is a front view of the light emitting device of the motorcycle according to one embodiment of the present invention.
Figure 45:
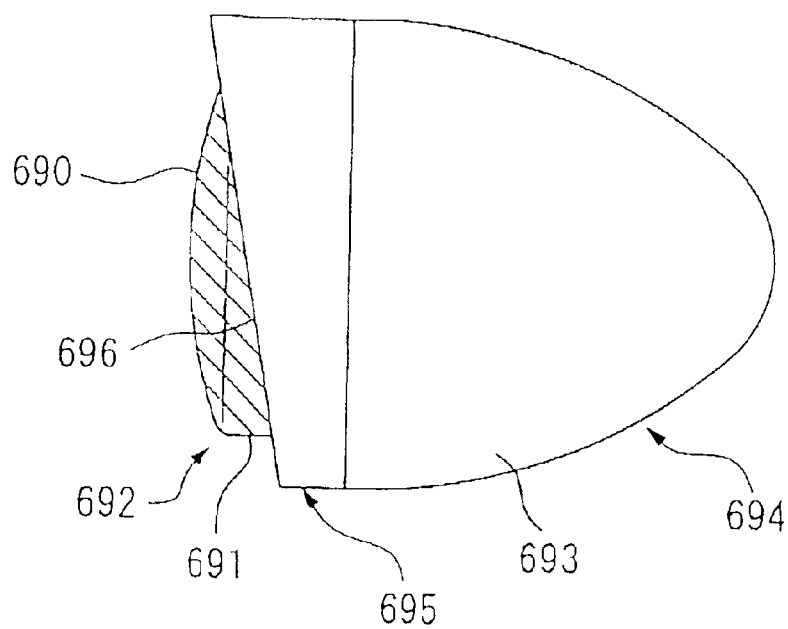
FIG. 45 is a side view of the light emitting device of the motorcycle according to one embodiment of the present invention.

The front winker (light emitting device) 5 and the rear winker (light emitting device) 17 each comprises, as shown in FIG. 43 to FIG. 45, a lens 692 formed of transparent synthetic resin including a translucent substantially disk shaped light emitting front section 690 and a translucent substantially cylindrical light emitting side surface section 691. A light emitting device body 694 includes a non-transparent housing 693 on which the lens 692 is attached on the side of the light emitting side surface section 691 opposite from the light emitting front section 690 and is provided with a light emitting member, not shown, such as a bulb or the like inside thereof. A separate non-transparent cover 695 is provided for covering only a part of the light emitting side surface section 691 of the lens 692 on the light emitting device body 694. The translucent light emitting front section 690 and the light emitting side surface section 691 emits a light towards the outside by emission of light by the light emitting member provided inside thereof. The term "front" of the light emitting front section 690 means the main light emitting direction which is forward of the vehicle body in the case of the front winker 5, and it is rearward of the vehicle body, in the case of the rear winker 17.

The cover 695 has an inclined front edge 696 so that the extent of exposure of the light emitting side surface section 691 in side view is larger on the lower side. In other words, it is inclined in such a manner that the upper side of the light emitting side surface section 691 is covered by a larger area. The cover 695 is fixed to the housing 693 with the lens 692. For example, a plated layer in the same color is formed on the surface of the cover 695 and on the surface of the housing 693.

Figure 46:
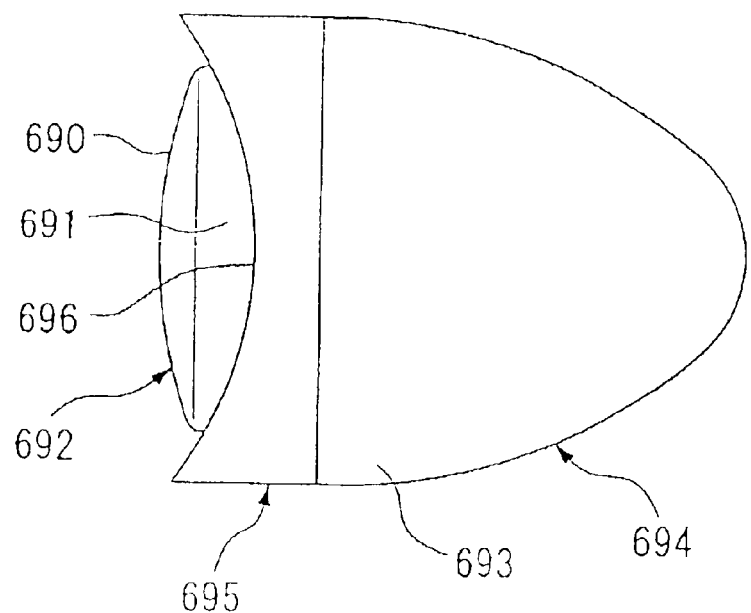
FIG. 46 is a side view of another example of the light emitting device of the motorcycle according to one embodiment of the present invention.

As shown in FIG. 46, the cover 695 may be formed so that the front edge 696 is configured into the shape of a circular arc in side view wherein the extent of exposure in side view of the light emitting side surface section 691 of the lens 692 is largest at the vertical center.

With the front winker (winker device) 5 according to the above embodiment, the winker 103 is supported by the winker holder 102 which comprises the holder members 105, 106 that are mounted on the front fork member 3 in sandwiching relation thereto. The winker cord 104 extends from the winker support base 103 a of the winker 103 and is inserted in the winker holder 102 through the cord insertion hole 108 that is made up of the grooves 105d, 106e defined in the holder members 105, 106, and is exposed downwardly out of the winker holder 102 inwardly of the front fork member 3 (remotely from the winker 3). Therefore, unlike the conventional winker device in which the winker cord is exposed from the winker support base, the visible exposed length of the winker cord 104 is reduced, making the winker cord 104 have a better appearance and for providing better protection of the winker cord 104 for simplifying the structure of the wiring of the winker cord 104.

With the front winker 5 according to the above embodiment, the annular groove 106g and the groove portion 106m of the cord insertion hole 108 for placing the winker cord 104 along the outer circumference of the front fork member 3 are defined in the other holder member 106. However, the annular groove 106g and the groove portion 106m may be defined in the holder member 105. In the embodiment, the winker holder 102 is made up of the pair of holder members 105, 106 which are of substantially equal shapes and produced by dividing a member which includes a cylindrical body having an axial hole 102a whose inside diameter is substantially equal to the diameter of the front fork member 3 and a cylindrical projection on one side (outer side) of the cylindrical body, with a plane extending along the axis of the cylindrical body. However, the holder members 105, 106 are not limited to the illustrated shape, but may be of other shapes. The winker holder 102 is not limited to two holder members, but may be made up of three or more holder members. The winker holder 102 may be of any of these alternative structures insofar as it may removably be mounted on the front fork member 3 in surrounding and sandwiching relation to the outer circumference of the front fork member 3. However, the winker holder 102 which is made up of the pair of holder members 105, 106 is simple in structure and easy to handle.

The present invention offers the following excellent advantages:

With the winker device according to the present invention the winker cord extends from the winker support base of the winker supported on a side of the winker holder which includes the plural holder members mounted on each of the front fork members and is inserted through the cord insertion hole defined in the winker holder and extends out of said winker holder. Therefore, the visible exposed length of the winker cord is reduced, making the winker cord have a better appearance and for providing better protection of the winker cord, and for simplifying the structure of the wiring of the winker cord.

With the winker device according to the present invention, since the winker cord is exposed from the winker holder inwardly of the front fork member, the winker cord is made better in appearance and better protected, and is simple in structure and easy to handle.

If the above structure is applied to the front winker 5 or the rear winker 17, then since the cover 695 covers only a portion of the light-emitting side face 691 of the light-emitting device body 694, the light-emitting side face 691 can emit light sideways from its area not covered with the cover 695. Winkers are required to emit light in front and side directions. However, if a portion other than the front and side portions is partly covered, e.g., if the upper side of the winker is covered, then the light emitted from the light-emitting side face 691 is prevented from being applied to the driver. If an area above the winker is covered, then rainwater is prevented from being applied directly to the light-emitting side face 691.

The winker is capable of emitting light sideways. If the upper side of the winker is covered with the cover 695, then the emitted light is prevented from being applied to the driver. If an area above the winker is covered, then rainwater is prevented from being applied directly to the light-emitting side face 691. Since only a portion of the light-emitting side face 691 of the light-emitting device body 694 is covered with the cover 695, the winker including the cover 695 may be of an excellent design such as a streamlined design.

Since the cover covers only a portion of the light-emitting side face of the light-emitting device body, the portion of the light-emitting side face which is not covered with the cover is capable of emitting light sideways. If the cover covers an upper surface of the light-emitting side face, then it prevents emitted light from being applied from the light-emitting side face to the driver, and if the cover covers an area above the light-emitting side face, then it prevents rainwater from being applied directly to the light-emitting side face.

Therefore, the light-emitting device is capable of emitting light sideways. If the upper side of the light-emitting device is covered with the cover, then the emitted light is prevented from being applied to the driver. If an area above the light-emitting device is covered, then rainwater is prevented from being applied directly to the light-emitting side face.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A winker device having a winker holder mounted on front fork members of a two-wheeled vehicle, a winker mounted on a side of the winker holder by a winker support base, and a winker cord extending from the winker through the winker support base, comprising:

a plurality of holder members disposed for surrounding and sandwiching an outer circumference of each of the front fork members; and said winker cord being inserted through a cord insertion hole defined in each of the holder members and extending out of said winker holder.

2. The winker device according to claim 1, wherein said winker holder comprises a first holder member and a second holder member disposed in front of and behind each of the front fork members and each having a side positioned outwardly of the front fork member, and the winker cord extends from said one side to the other side through an annular groove of a cord insertion hole defined in the second holder member and is exposed inwardly of the front fork member from the other side.

3. The winker device according to claim 1, wherein a first of said plurality of holder members is formed with a substantially column shaped projection and having a notched plane on a side of a second of said plurality of older members, and wherein the winker is supported by the projection that is connected to the winker support base.

4. The winker device according to claim 1, wherein a first of said plurality of holder members includes a groove of a crank shape in a side view opening towards an outer end, a diameter of said groove being slightly larger relative to a diameter of the winker cord.

5. The winker device according to claim 4, wherein a second of said plurality of holder members includes a groove in a side view opening towards an outer end, a diameter of said groove being slightly larger relative to a diameter of the winker cord.

6. The winker device according to claim 5, wherein said groove in the first of said plurality of holder members and the groove in the second of said plurality of holder members form a cord insertion hole for receiving the winker cord.

7. A winker device adapted to be mounted on a front fork of a vehicle comprising:

a plurality of holder members disposed for surrounding and sandwiching an outer circumference of a front fork of a vehicle;

a winker supporting base;

a winker mounted on a side of the winker holder by said winker support base; and a winker cord extending from the winker through the winker support base;

said winker cord being inserted through a cord insertion hole defined in each of the holder members and extending out of said winker holder.

8. The winker device according to claim 7, wherein said winker holder comprises a first holder member and a second holder member disposed in front of and behind each of the front fork members and each having a side positioned outwardly of the front fork member, and the winker cord extends from said one side to the other side through an annular groove of a cord insertion hole defined in the second holder member and is exposed inwardly of the front fork member from the other side.

9. The winker device according to claim 7, wherein a first of said plurality of holder members is formed with a substantially column shaped projection and having a notched plane on a side of a second of said plurality of holder members, and wherein the winker is supported by the projection that is connected to the winker support base.

10. The winker device according to claim 7, wherein a first of said plurality of holder members includes a groove of a crank shape in a side view opening towards an outer end, a diameter of said groove being slightly larger relative to a diameter of the winker cord.

11. The winker device according to claim 10, wherein a second of said plurality of holder members includes a groove in a side view opening towards an outer end, a diameter of said groove being slightly larger relative to a diameter of the winker cord.

12. The winker device according to claim 11, wherein said groove in the first of said plurality of holder members and the groove in the second of said plurality of holder members form a cord insertion hole for receiving the winker cord.

13. A vehicular light-emitting device in a winker device, comprising:

a light-emitting device body having a light-emitting front face and a light-emitting side face, said light-emitting front face and said light-emitting side face being capable of emitting light; and a cover covering only a portion of the light-emitting side face of the light-emitting device body, wherein the winker device is adapted to be mounted on a front fork of a vehicle, the winker device comprising: a plurality of holder members disposed for surrounding and sandwiching an outer circumference of a front fork of a vehicle.

14. The vehicular light-emitting device in a winker device according to claim 13, the winker device further comprising:

a winker supporting base;

a winker mounted on a side of the winker holder by said winker support base; and a winker cord extending from the winker through the winker support base;

said winker cord being inserted through a cord insertion hole defined in each of the holder members and extending out of said winker holder.

* * * * *